United States Patent

Nishiura et al.

Patent Number: 6,114,826
Date of Patent: Sep. 5, 2000

[54] STEPPING MOTOR DRIVING APPARATUS HAVING SMALL TIME CONSTANT REGENERATIVE CURRENT PATH

[75] Inventors: Haruo Nishiura; Fumiyuki Niwa, both of Shiga, Japan

[73] Assignee: NEC Corporation, Tokyo, Japan

[21] Appl. No.: 09/066,941

[22] Filed: Apr. 28, 1998

[30] Foreign Application Priority Data

Apr. 28, 1997 [JP] Japan ..................... 9-109977

[51] Int. Cl.$^7$ ................................. G05B 19/40
[52] U.S. Cl. .................... 318/685; 318/696; 318/254
[58] Field of Search ................... 318/362–383, 318/254, 696, 685, 439, 138

[56] References Cited

U.S. PATENT DOCUMENTS

| | | | |
|---|---|---|---|
| 3,371,259 | 2/1968 | James et al. | 318/380 |
| 3,378,740 | 4/1968 | Cruel | 318/380 |
| 3,628,112 | 12/1971 | Gross | 318/258 |
| 4,443,746 | 4/1984 | Araki | 318/696 |
| 4,710,686 | 12/1987 | Guzik | 318/293 |
| 4,980,838 | 12/1990 | Daggett et al. | 318/568.16 |
| 5,132,598 | 7/1992 | Albanesius et al. | 318/285 |
| 5,144,211 | 9/1992 | Daggett et al. | 318/568.11 |
| 5,283,510 | 2/1994 | Tamaki et al. | 318/696 |
| 5,818,180 | 10/1998 | Canclini | 318/254 |
| 5,875,281 | 2/1999 | Thexton et al. | 318/801 |
| 5,942,872 | 8/1999 | Stegger et al. | 318/696 |
| 5,952,856 | 9/1999 | Horiguchi et al. | 318/696 |
| 5,982,134 | 11/1999 | Tanaka | 318/696 |

FOREIGN PATENT DOCUMENTS 7-194194  7/1995  Japan.

*Primary Examiner*—David Martin
*Attorney, Agent, or Firm*—Foley & Lardner

[57] ABSTRACT

In an apparatus for driving a stepping motor in a micro step manner by a PWM control signal generated based on a sense voltage, including a sense resistor for generating the sense voltage, a driving current path including the sense resistor and the stepping motor is provided and is operated so that a driving current flows through the stepping motor, when the PWM control signal is activated. A regenerative current path including the sense resistor and is provided the stepping motor and is operated so that a regenerative current flows through the stepping motor, when the PWM control signal is not activated. A resistance of the regenerative current path is larger than a resistance of the driving current path.

8 Claims, 29 Drawing Sheets

| MODE | I | II | III | IV |
|------|---|----|-----|----|
| DIR  | L | L  | H   | H  |
| PWM  | L | H  | L   | H  |
| A1   | L | H  | H   | H  |
| B1   | H | H  | L   | H  |
| A2   | H | H  | L   | L  |
| B1   | L | L  | H   | H  |
| 11   | ON | OFF | OFF | OFF |
| 12   | OFF | OFF | ON | OFF |
| 13   | OFF | OFF | ON | OFF |
| 14   | ON | OFF | OFF | OFF |

MODE I

MODE II

MODE III

MODE IV

Fig. 7B

| MODE | I | II | III | IV |
|---|---|---|---|---|
| DIR | L | L | H | H |
| PWM | L | H | L | H |
| A1 | L | H | H | H |
| A̅1̅ | H | L | L | L |
| B1 | H | H | L | H |
| B̅1̅ | L | L | H | L |
| A2 | H | H | L | L |
| B2 | L | L | H | H |
| A3 | L | H | L | L |
| B3 | L | L | L | H |
| 11 | ON | OFF | OFF | OFF |
| 12 | OFF | OFF | ON | OFF |
| 13 | OFF | OFF | ON | OFF |
| 14 | ON | OFF | OFF | OFF |
| 31 | OFF | ON | OFF | OFF |
| 32 | OFF | OFF | OFF | ON |
| 33 | OFF | OFF | ON | ON |
| 34 | ON | ON | OFF | OFF |

MODE I

MODE II

MODE I

MODE II

*Fig. 12C*  MODE III
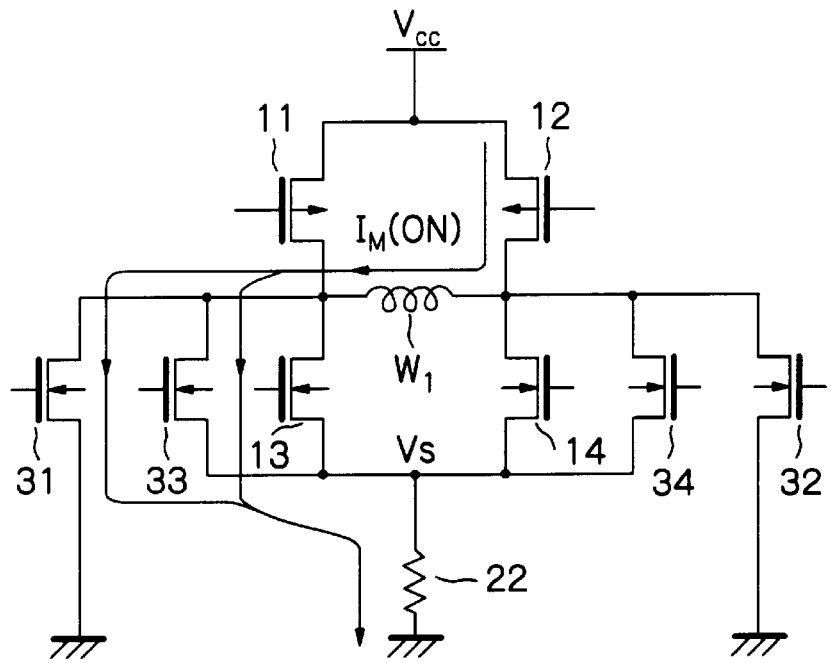
*Fig. 12D*  MODE IV
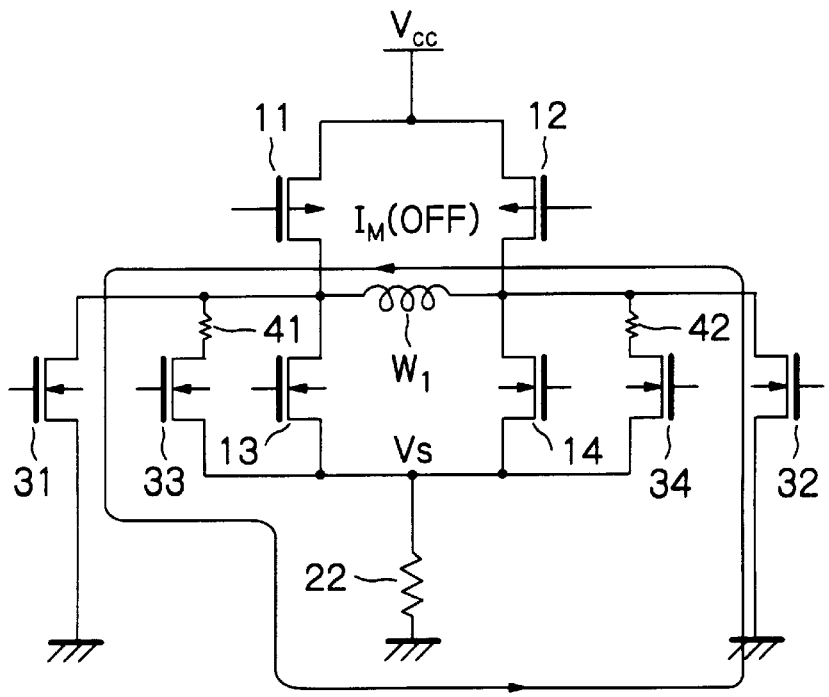

MODE I

MODE II

Fig. 14C  MODE III
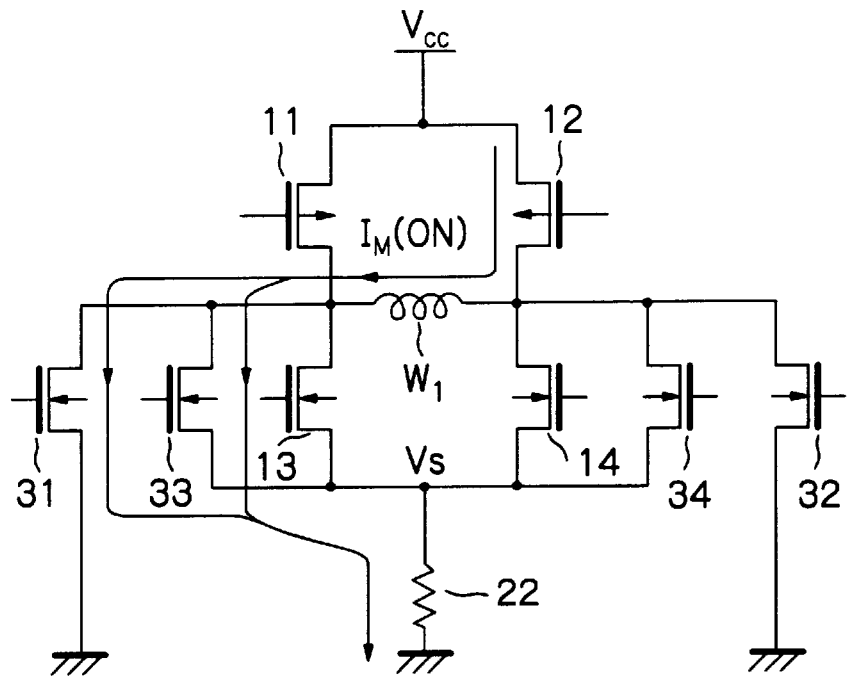
Fig. 14D  MODE IV
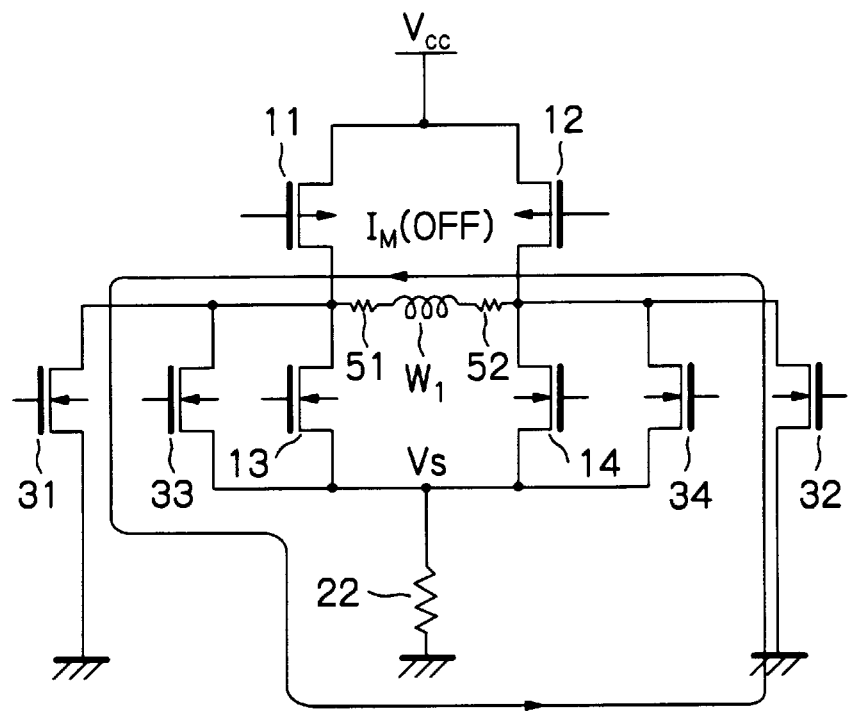

Fig. 16B

| MODE | I | II | III | IV |
|---|---|---|---|---|
| DIR | L | L | H | H |
| PWM | L | H | L | H |
| A1 | L | H | H | H |
| B1 | H | H | L | H |
| A3 | L | H | L | L |
| B3 | L | L | L | H |
| A4 | H | M | L | L |
| B4 | L | L | H | M |
| 11 | ON | OFF | OFF | OFF |
| 12 | OFF | OFF | ON | OFF |
| 13 | OFF | OFF | ON | "HALF" |
| 14 | ON | "HALF" | OFF | OFF |
| 31 | OFF | ON | OFF | OFF |
| 32 | OFF | OFF | OFF | ON |

"HALF"=HIGH RESISTANCE STATE

MODE I

MODE II

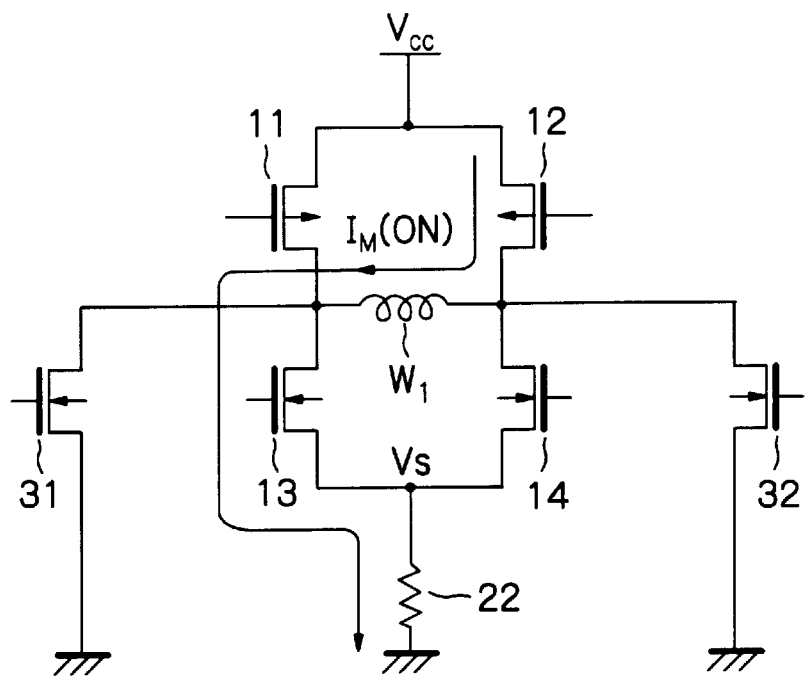
Fig. 17C  MODE III
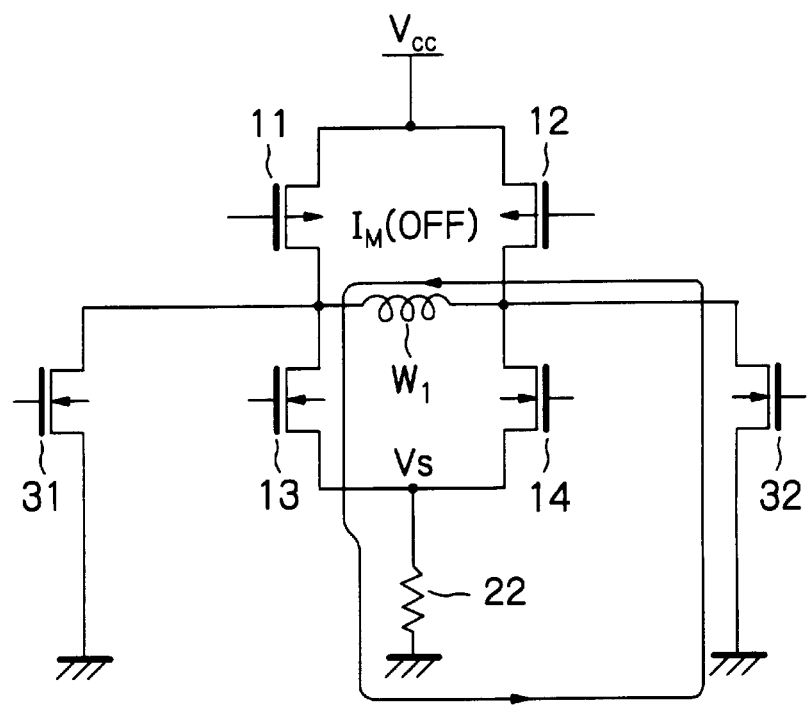
Fig. 17D  MODE IV

MODE I

MODE IV

MODE III

MODE II

MODE I

MODE IV

MODE III

MODE II

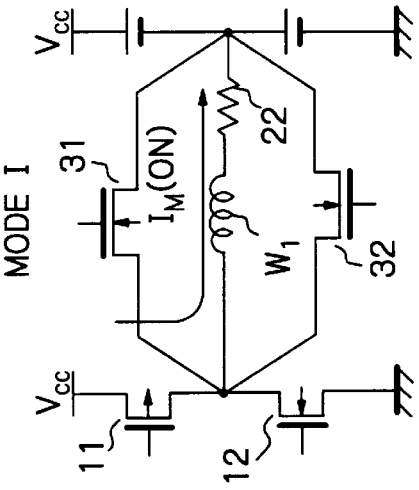
Fig. 21A
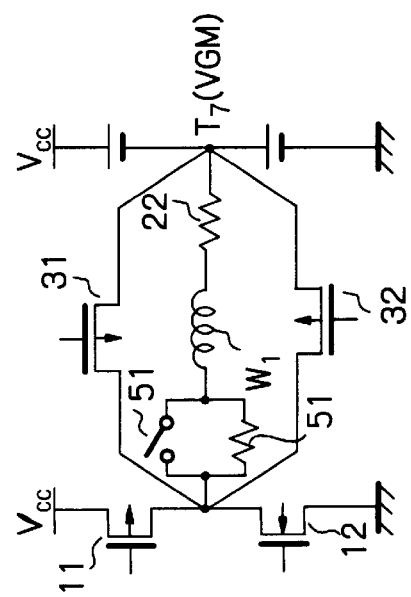
Fig. 21B MODE I
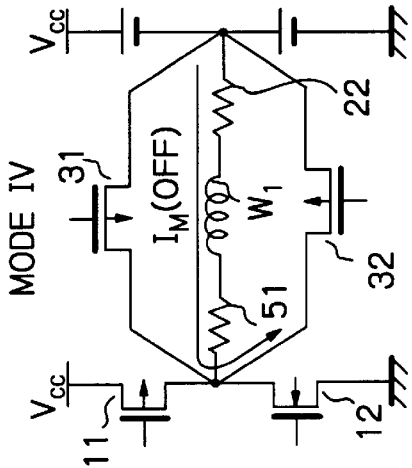
Fig. 21E MODE IV
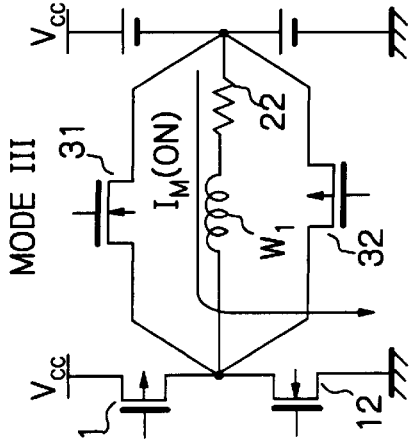
Fig. 21D MODE III
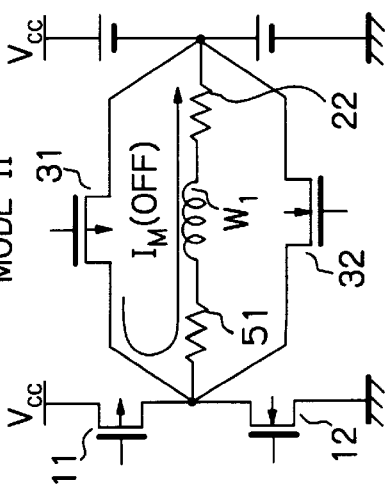
Fig. 21C MODE II

STEPPING MOTOR DRIVING APPARATUS HAVING SMALL TIME CONSTANT REGENERATIVE CURRENT PATH

BACKGROUND OF THE INVENTION

1. Field of the Invention

The present invention relates to an apparatus for driving a stepping motor in a micro step manner by using a pulse width modulation (PWM) control signal.

2. Description of the Related Art

In a prior art apparatus for driving a stepping motor in a micro step manner by a PWM control signal generated based on a sense voltage, including a sense resistor for generating the sense voltage, a driving current path including the sense resistor and the stepping motor is provided and is operated so that a driving current flows through the stepping motor, when the PWM control signal is activated. A regenerative current path including the sense resistor and the stepping motor is provided and is operated so that a regenerative current flows through the stepping motor, when the PWM control signal is not activated. This will be explained later in detail.

In the above-mentioned prior art apparatus, however, a resistance of the regenerative current path is generally small. As a result, a time constant of the regenerative current path is large, and accordingly, a reduction rate of the regenerative current is small. Therefore, the sense voltage of the sense resistor cannot follow the change of the step reference voltage signal of a step reference voltage generating circuit. As a result, the drive current is distorted. Particularly, the magnitude of the drive current on the decrease cannot be decreased in a sine wave form, which creates vibration and noise in the motor.

SUMMARY OF THE INVENTION

It is an object of the present invention to reduce the time constant of a regenerative current in a stepping motor, thus suppressing the vibration and noise in the motor.

According to the present invention, in an apparatus for driving a stepping motor in a micro step manner by a PWM control signal generated based on a sense voltage, including a sense resistor for generating the sense voltage, a driving current path including the sense resistor and the stepping motor is provided and is operated so that a driving current flows through the stepping motor, when the PWM control signal is activated. A regenerative current path including the sense resistor and the stepping motor is provided and is operated so that a regenerative current flows through the stepping motor, when the PWM control signal is not activated. A resistance of the regenerative current path is larger than a resistance of the driving current path.

BRIEF DESCRIPTION OF THE DRAWINGS

The present invention will be more clearly understood from the description as set forth below, as compared with the prior art, with reference to the accompanying drawings, wherein:

FIG. 7B is a table showing the input/output relationship of the predriver of FIG. 6;

FIGS. 12A, 12B, 12C and 12D are circuit diagrams for explaining the operation of the apparatus of FIG. 11;

FIGS. 14A, 14B, 14C and 14D are circuit diagrams for explaining the operation of the apparatus of FIG. 13;

FIG. 16B is a table showing the input/output relationship of the predriver of FIG. 15;

FIGS. 17A, 17B, 17C and 17D are circuit diagrams for explaining the operation of the apparatus of FIG. 15;

FIG. 21A is a circuit diagram illustrating a modification of the apparatus of FIG. 13; and FIGS. 21B, 21C, 21D and 21E are circuit diagrams for explaining the operation of the apparatus of FIG. 21A.

DESCRIPTION OF THE PREFERRED EMBODIMENTS

Before the description of the preferred embodiments, a prior art stepping motor driving apparatus will be explained with reference to FIGS. 1, 2, 3A, 3B, 4A, 4B, 4C, 4D and 5.

Figure 1:
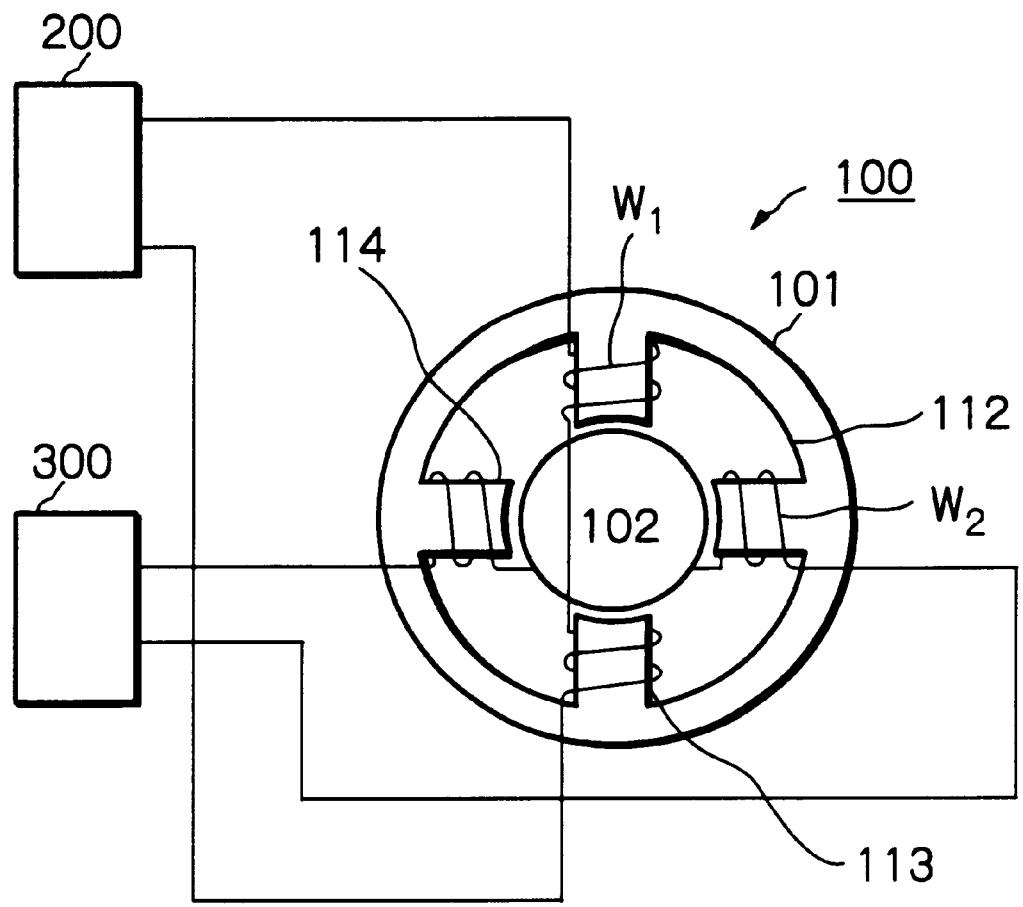
FIG. 1 is a diagram illustrating a prior art stepping motor driving apparatus.

In FIG. 1, which illustrates a prior art stepping motor driving apparatus for a motor, reference numeral 100 designates a two-phase exciting type motor formed by a stator 101 having four poles 111, 112, 113 and 114 and a rotor 102 rotatably mounted within the stator 101. A winding $W_1$ is wound on the poles 111 and 113 and is controlled by a stepping motor driving apparatus 200, and a winding $W_2$ is wound on the poles 112 and 114 and is controlled by a stepping motor driving apparatus 300. That is, currents having a phase difference of 90° are supplied by the stepping motor driving apparatuses 200 and 300 to the windings $W_1$ and $W_2$, thus rotating the rotor 102.

Figure 2:
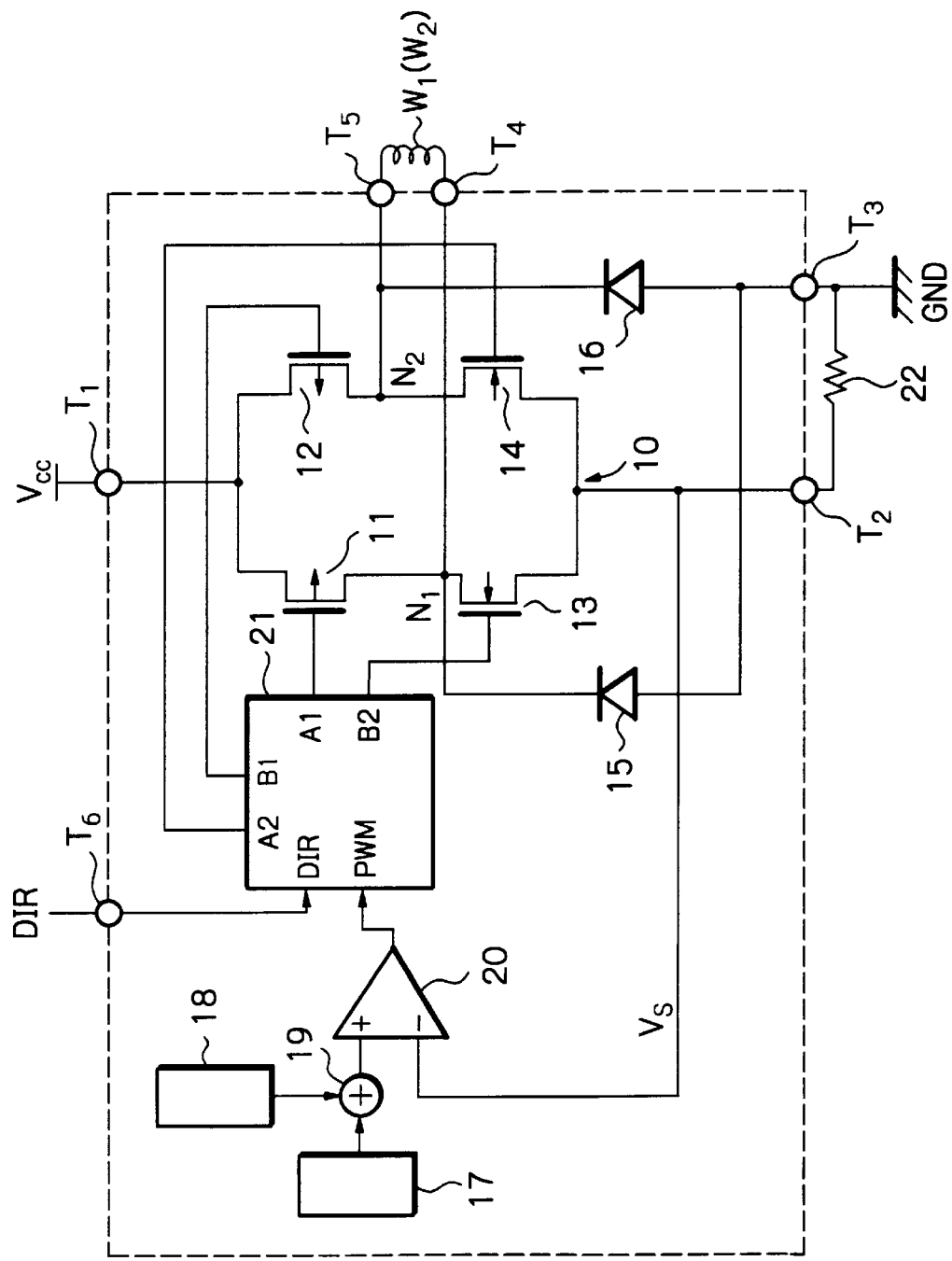
FIG. 2 is a circuit diagram of the stepping motor driving apparatus of FIG. 1.

In FIG. 1, which illustrates the stepping motor driving apparatus 200 (or 300) of FIG. 2, an H bridge circuit 10 is provided between a power supply terminal $T_1$ to which a power supply voltage $V_{CC}$ is applied and a sense resistor terminal $T_2$. The H bridge circuit 10 is formed by P-channel MOS transistors 11 and 12 serving as PWM switches and N-channel MOS transistors 13 and 14 serving as phase switches.

A flywheel diode 15 is connected between a node $N_1$ of the transistors 11 and 13 and a ground terminal $T_3$ to which a ground voltage GND is applied. Also, a flywheel diode 16 is connected between a node $N_2$ of the transistors 12 and 14 and the ground terminal $T_3$. Each of the flywheel diodes 15 and 16 forms a current path for a regenerative current.

The nodes $N_1$ and $N_2$ are connected to terminals $T_4$ and $T_5$, respectively, which are also connected to the winding $W_2$ (or $W_2$) of the motor 100.

A step reference voltage signal generated from a step reference voltage generating circuit 17 is added to a triangular wave signal generated from a triangular wave generating circuit 18 at an adder 19. An output signal of the adder 19 is supplied to a positive phase input of a comparator 20, while a sense voltage $V_S$ at the sense resistor terminal $T_2$ is supplied to a negative phase input of the comparator 20. As a result, the comparator 20 generates a PWM control signal and transmits it to a predriver 21.

The predriver 21 also receives a direction signal from a direction signal terminal $T_6$ to which the directions signal is supplied from a control circuit (not shown).

Further, a sense resistor 22 is connected as an external element between the sense resistor terminal $T_2$ and the ground terminal $T_3$.

Figures 3A, 3B:
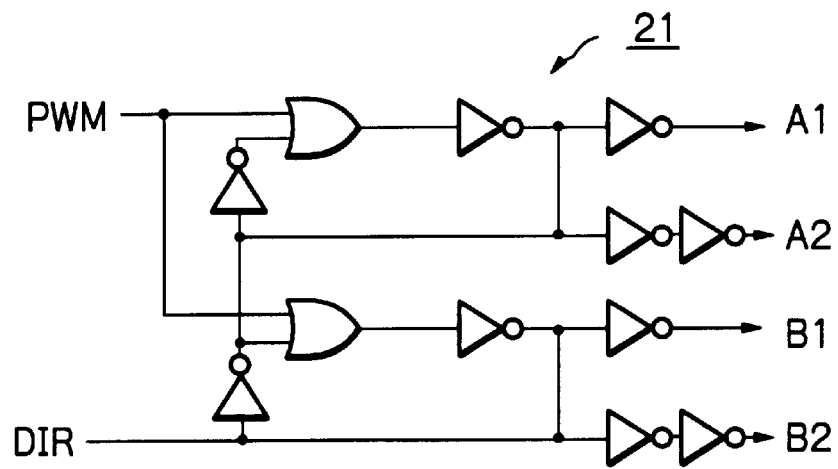
FIG. 3A is a logic circuit diagram of the predriver of FIG. 2.
FIG. 3B is a table showing the input/output relationship of the predrive of FIG. 2.

The predriver 21 is constructed by a logic circuit as illustrated is FIG. 3A, and the relationship between the inputs and outputs of the predriver 21 is shown in FIG. 3B.

Figure 4A:
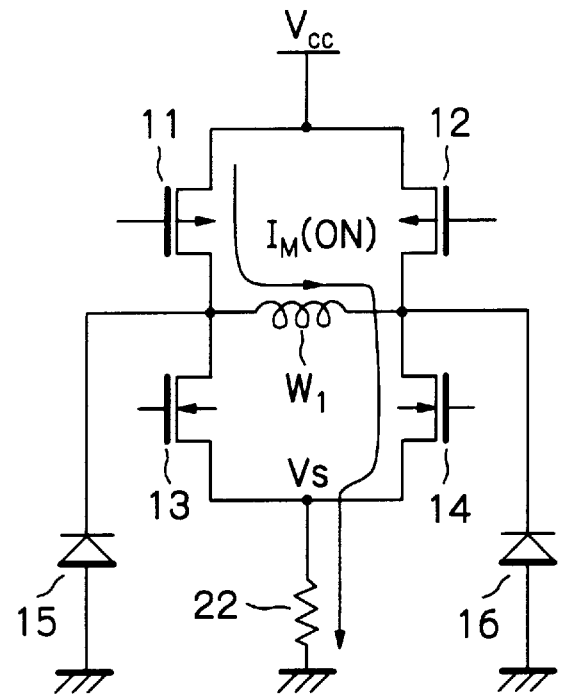
FIG. 4A, 4B, 4C and 4D are circuit diagrams for explaining the operation of the apparatus of FIG. 2.
Figure 4B:
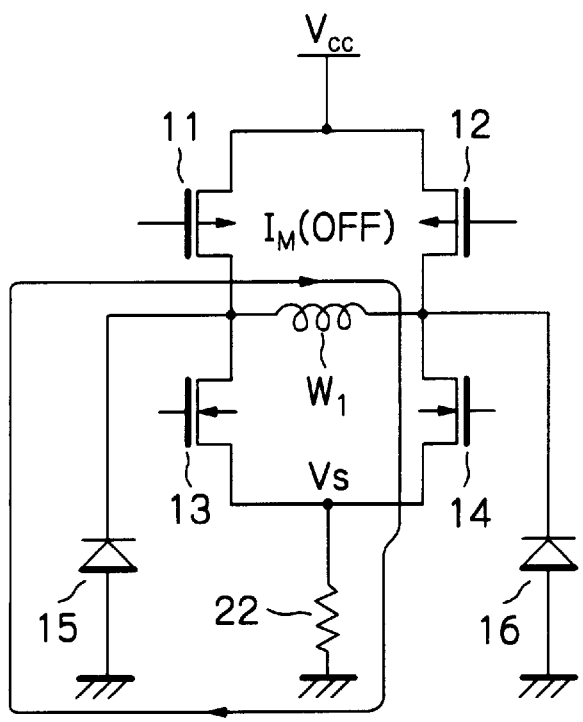

In a mode I where the direction signal DIR is low and the PWM control signal is low, the transistors 11 and 14 are turned ON and the transistors 12 and 13 are turned OFF. As a result, as illustrated in FIG. 4A, a drive current $I_K$ (ON) flows from the power supply terminal ($V_{CC}$) via the transistors 11 and 14 and the sense resistor 22 to the ground terminal (GND). Then, when the PWM control signal is switched from low to high, so that the mode I is switched to a mode II, the transistor 11 is turned OFF. As a result, as illustrated in FIG. 4B, a regenerative current $I_M$ (OFF) due to the counter-electromotive force of the winding $W_1$ flows through a current path formed by the transistor 14, the sense resistor 22 and the flywheel diode 15.

Figure 4C:
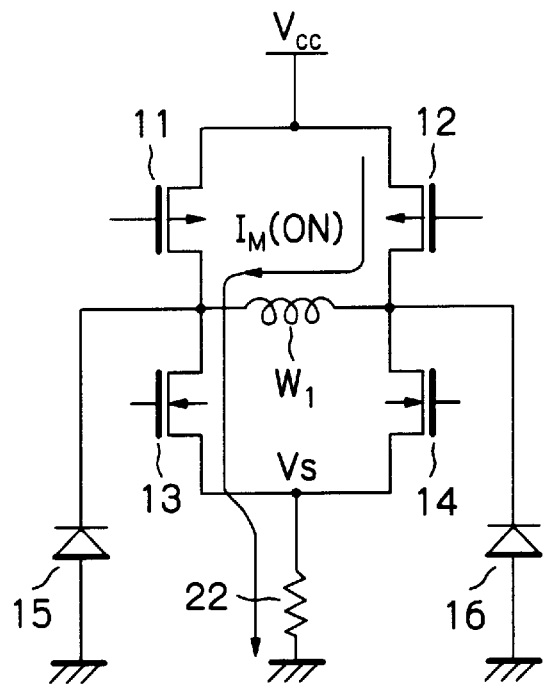
Figure 4D:
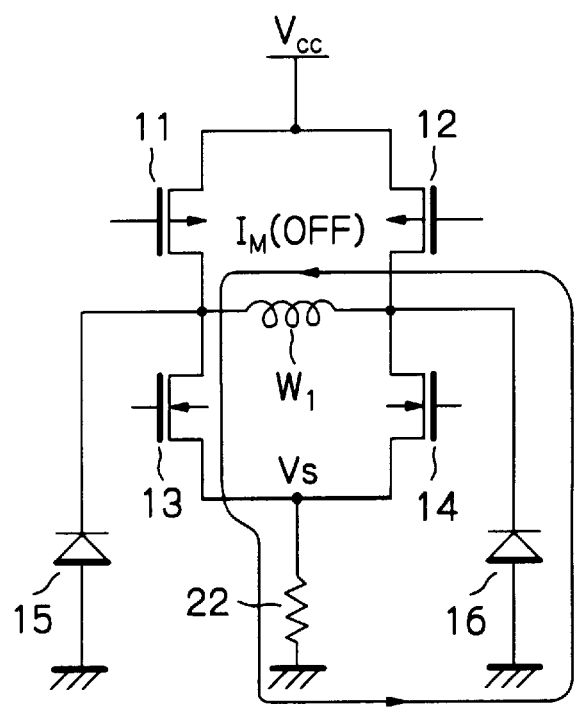

Similarly, in a mode III where the direction signal DIR is high and the PWM control signal is low, the transistors 12 and 13 are turned ON and the transistors 11 and 14 are turned OFF. As a result, as illustrated in FIG. 4C, a drive current $I_M$ (ON) flows from the power supply terminal ($V_{CC}$) via the transistors 12 and 13 and the sense resistor 22 to the ground terminal (GND). Then, when the PWM control signal is switched from low to high, so that the mode III is switched to a mode IV, the transistor 12 is turned OFF. As a result, as illustrated in FIG. 4D, a regenerative current $I_M$ (OFF) due to the counter-electromotive force of the winding $W_1$ flows through a current path formed by the transistor 13, the sense resistor 22 and the flywheel diode 16.

Thus, the drive current $I_M$ for the winding $W_1$ formed by the currents $I_K$ (ON) and $I_M$ (OFF) can form a pseudo sine waveform.

The above-mentioned regenerative current $I_M$ (OFF) is determined by $$I_M(OFF)=I_0 \cdot \exp(-t/\tau) \tag{1}$$

Also, a time constant $\tau$ is determined by $$\tau = L/R \tag{2}$$

where L is an inductance of the winding $W_1$, and R is a resistance component of the current path formed by the elements 14 (13), 22, 15 (16) and $W_1$.

Figure 5:
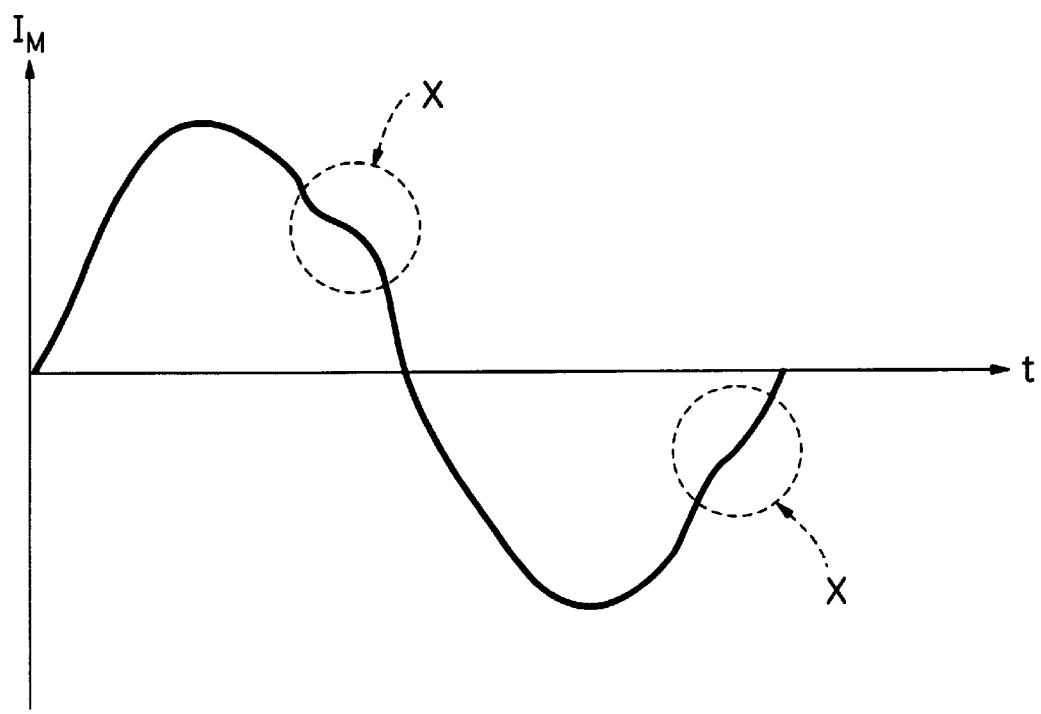
FIG. 5 is a timing diagram of the drive current in the apparatus of FIG. 2.

In the stepping motor driving apparatus of FIG. 2, however, the ON resistance of the transistor 13 (14) is generally small, so that the time constant $\tau$ is large, and the reduction rate of the regenerative current $I_M$ (OFF) is small. Therefore, the sense voltage $V_S$ of the sense resistor 22 cannot follows the change of the step reference voltage signal of the step reference voltage generating circuit 17. As a result, as shown in FIG. 5, the drive current $I_M$ is distorted. Particularly, as indicated by X in FIG. 5, the reduction rate of the drive current $I_M$ on the decrease cannot be large in a sine waveform, which creates vibration and noise in the motor.

Figure 6:
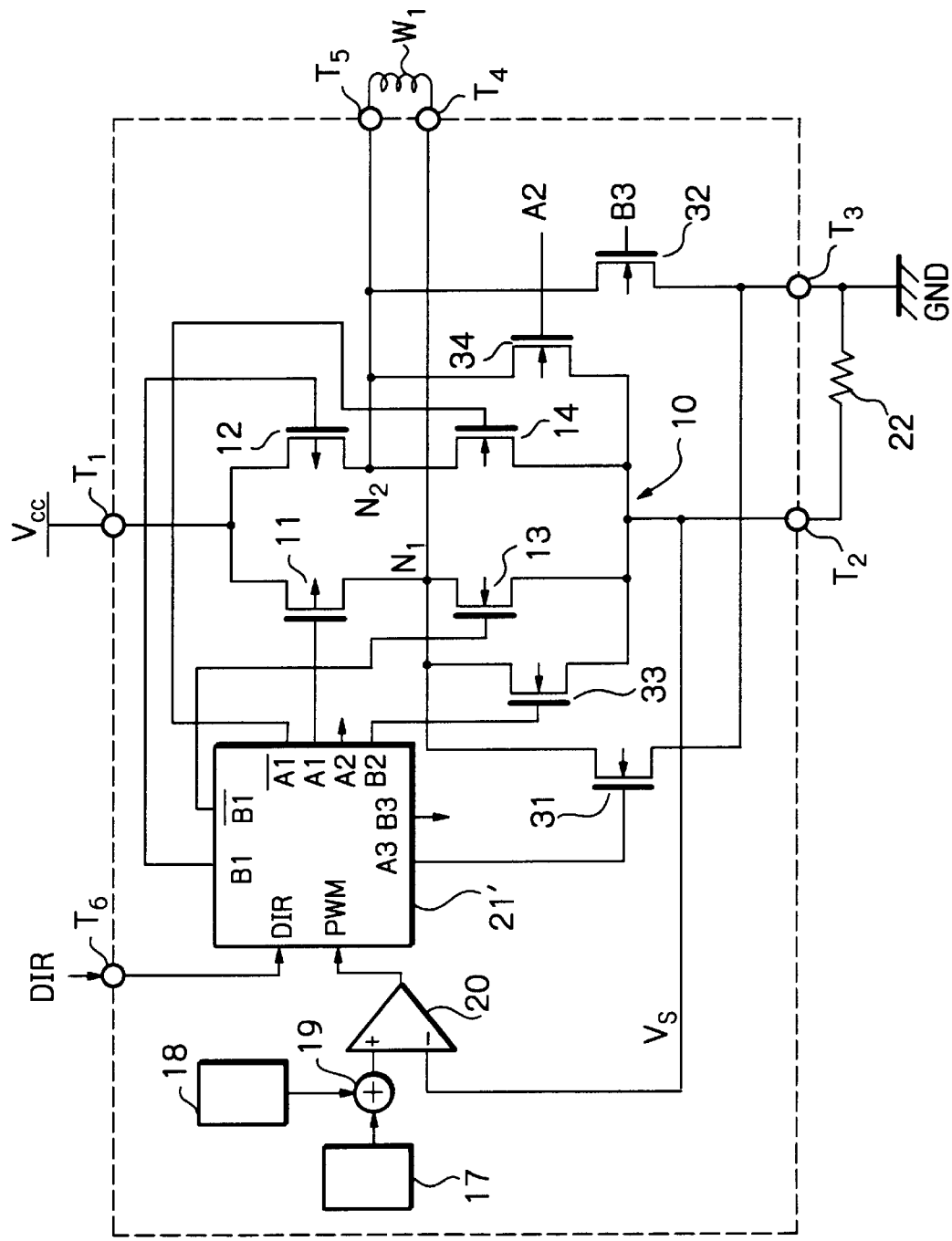
FIG. 6 is a circuit diagram illustrating a first embodiment of the stepping motor driving apparatus according to the present invention.

In FIG. 6, which illustrates a first embodiment of the present invention, N-channel MOS transistors 31 and 32 serving as regenerative switches are provided instead of the flywheel diodes 15 and 16, respectively, of FIG. 2. Also, N-channel MOS transistors 33 and 34 are connected in parallel with the transistors 13 and 14, respectively, of FIG. 2. Each of the transistors 33 and 34 has a larger ON resistance than each of the transistors 13 and 14. For example, the ON resistance of each of the transistors 33 and 34 is about ten to twenty times that of each of the transistors 13 and 14. The transistors 33 and 34 are operated to decrease the time constant $\tau$ of the current path of the regenerative current $I_M$ (OFF).

Figure 7A:
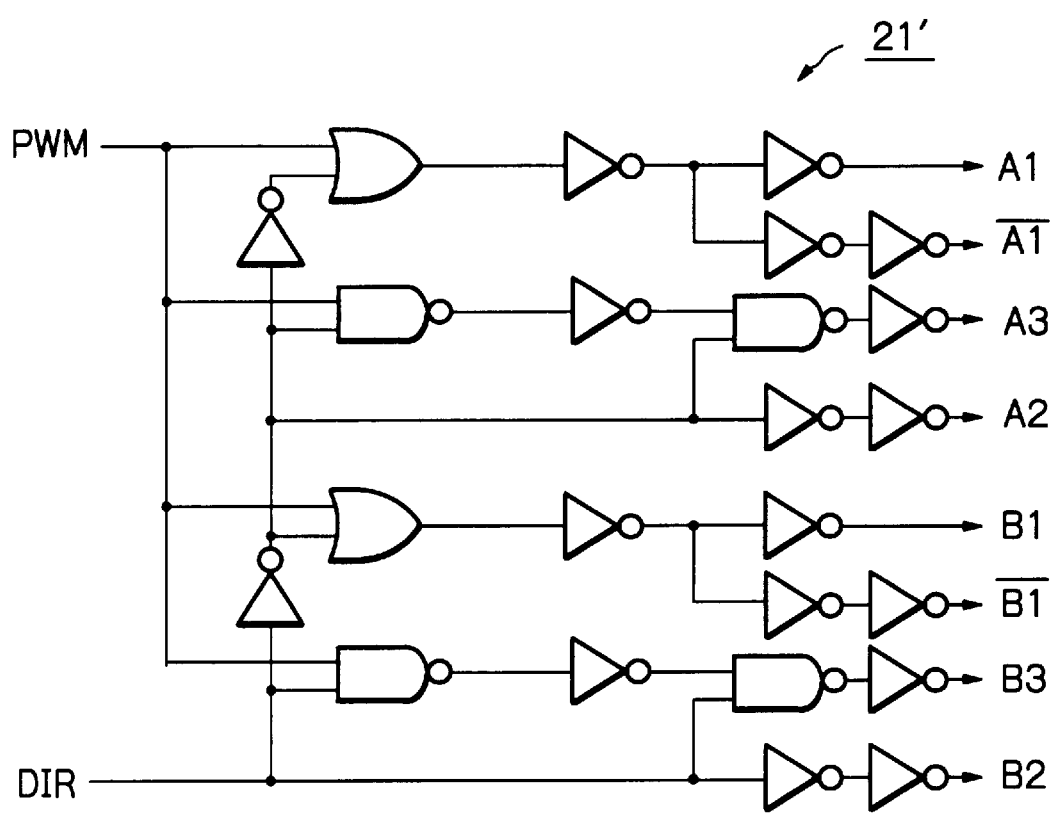
FIG. 7A is a logic circuit diagram of the predriver of FIG. 6.

The predriver 21 of FIG. 2 is modified to a predriver 21' which is constructed by a logic circuit as illustrated is FIG. 7A, and the relationship between the inputs and outputs of the predriver 21' is shown in FIG. 7B.

Figure 8A:
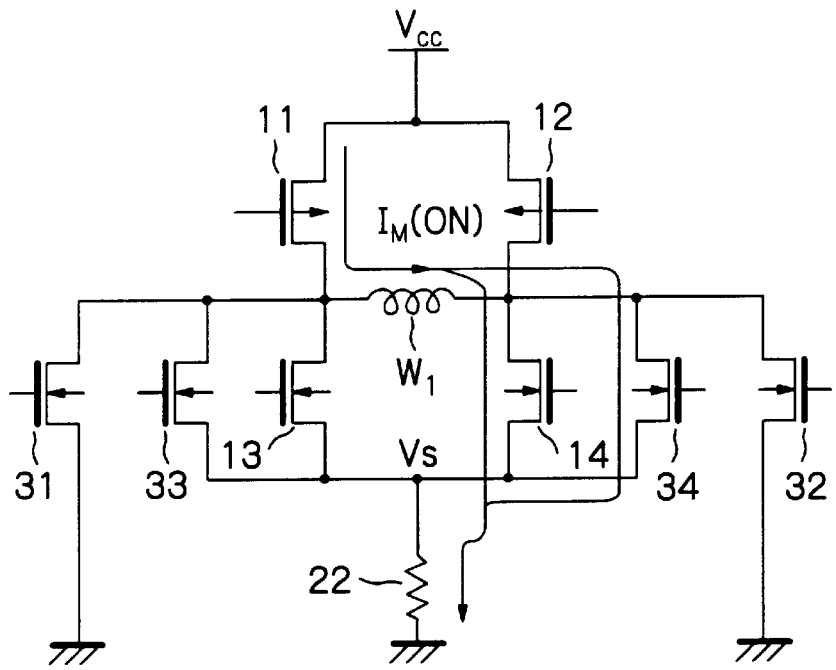
FIGS. 8A, 8B, 8C and 8D are circuit diagrams for explaining the operation of the apparatus of FIG. 6.
Figure 8B:
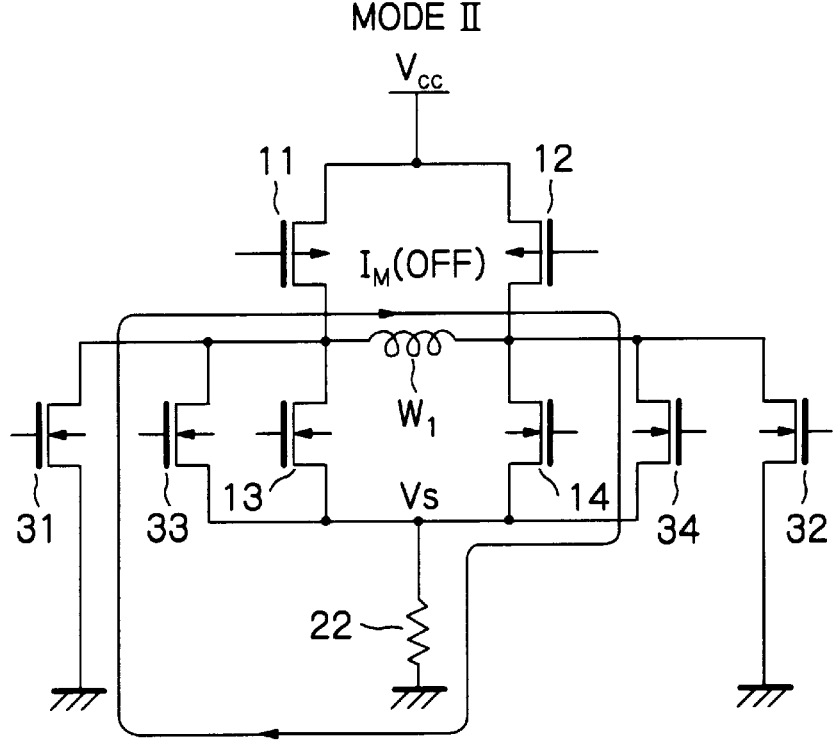

In mode I where the direction signal DIR is low and the PWM control signal is low, the transistors 11, 14 and 34 are turned ON and the transistors 12, 13, 31, 32 and 33 are turned OFF. As a result, as illustrated in FIG. 8A, a drive current $I_M$ (ON) flows from the power supply terminal ($V_{CC}$) via the transistors 11, 14, 34 and the sense resistor 22 to the ground terminal (GND). Then, when the PWM control signal is switched from low to high, so that the mode I is switched to a mode II, the transistors 11 and 14 are turned OFF and simultaneously, the transistor 31 is turned ON. As a result, as illustrated in FIG. 8B, a regenerative current $I_M$ (OFF) due to the counter-electromotive force of the winding $W_1$ flows through a current path formed by the transistor 34, the sense resistor 22 and the transistor 31.

Figure 8C:
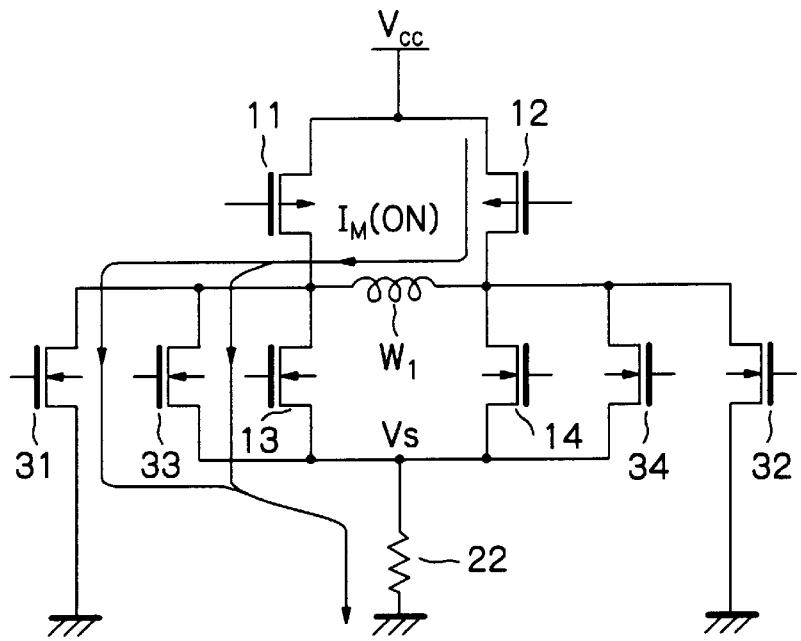
Figure 8D:
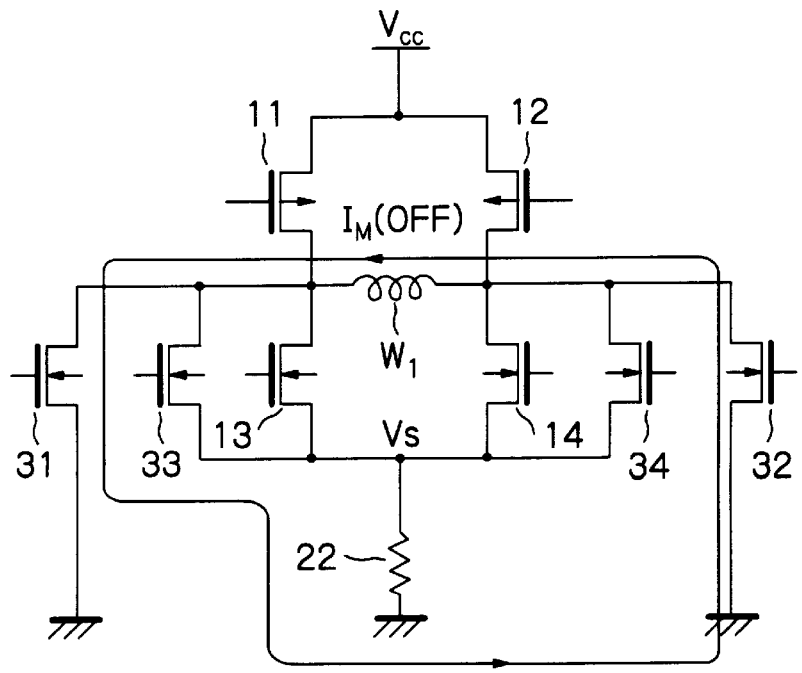

Similarly, in a mode III where the direction signal DIR is high and the PWM control signal is low, the transistors 12, 13 and 33 are turned ON and the transistors 11, 14, 31, 32 and 34 are turned OFF. As a result, as illustrated in FIG. 8C, a drive current $I_M$ (ON) flows from the power supply terminal ($V_{CC}$) via the transistors 12, 13 and 33 and the sense resistor 22 to the ground terminal (GND). Then, when the PWM control signal is switched from low to high, so that the mode III is switched to a mode IV, the transistors 12 and 13 are turned OFF and simultaneously, the transistor 32 is turned ON. As a result, as illustrated in FIG. 8D, a regenerative current $I_M$ (OFF) due to the counter-electromotive force of the winding $W_1$ flows through a current path formed by the transistor 33, the sense resistor 22 and the transistor 32.

Thus, the drive current $I_M$ for the winding $W_1$ formed by the currents $I_M$ (ON) and $I_M$ (OFF) can form a psuedo sine waveform.

In the first embodiment, since the ON resistance of the transistor 33 (34) is larger than that of the transistor 13 (14), the time constant τ of the regenerative current $I_M$ (OFF) is made smaller, so that the reduction rate of the regenerative current $I_M$ (OFF) is large. Also, the initial sense voltage $V_S$ is decreased. Therefore, the sense voltage $V_S$ of the sense resistor 22 can sufficiently follow the change of the step reference voltage signal of the step reference voltage generating circuit 17. As a result, the drive current $I_M$ is not distorted, which hardly creates vibration and noise in the motor.

In FIG. 6, note that the ON resistance of the transistor 31 (32) can be made larger to further decrease the time constant τ of the regenerative current $I_M$ (OFF).

Figure 9:
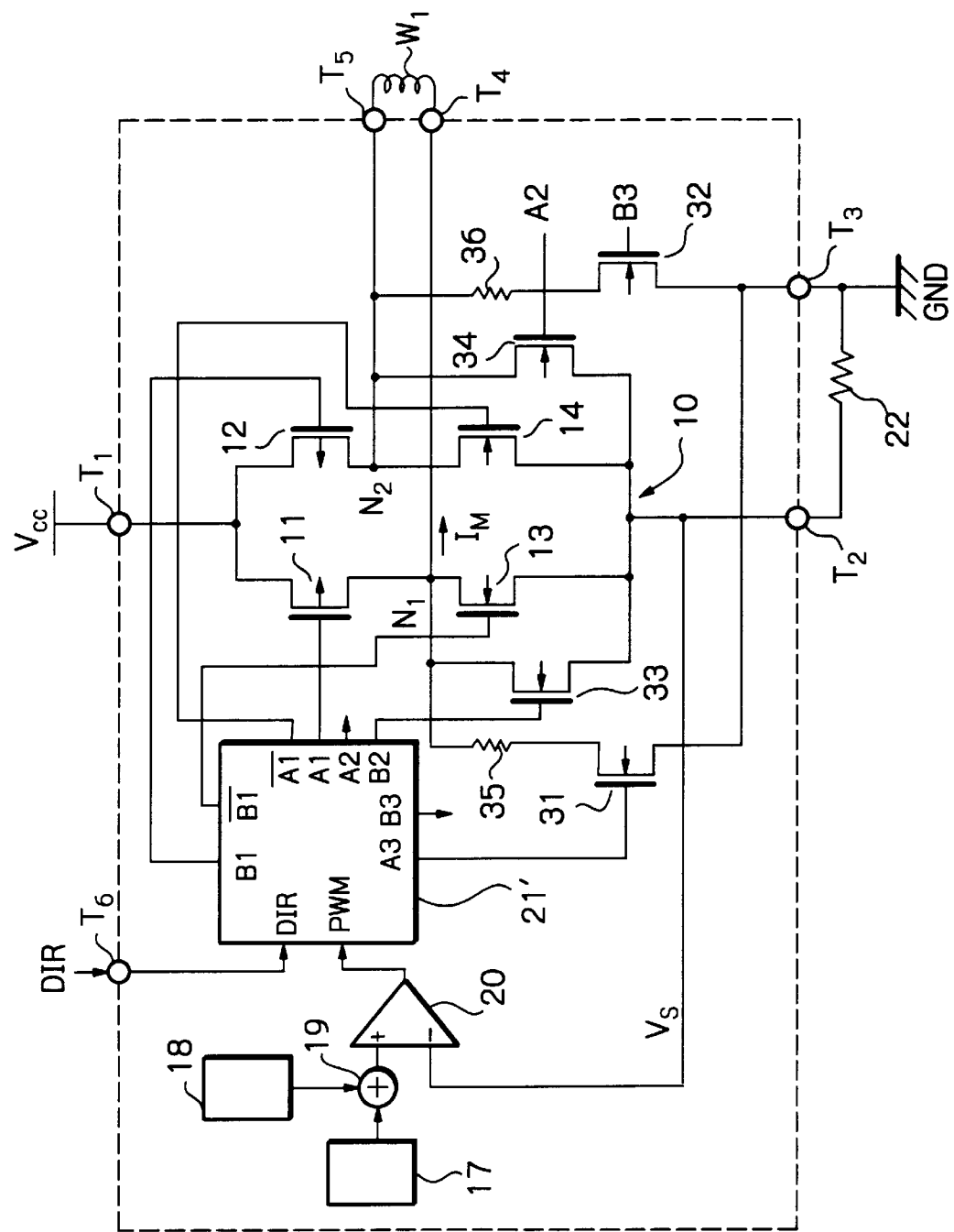
FIG. 9 is a circuit diagram illustrating a second embodiment of the stepping motor driving apparatus according to the present invention.
Figure 10A:
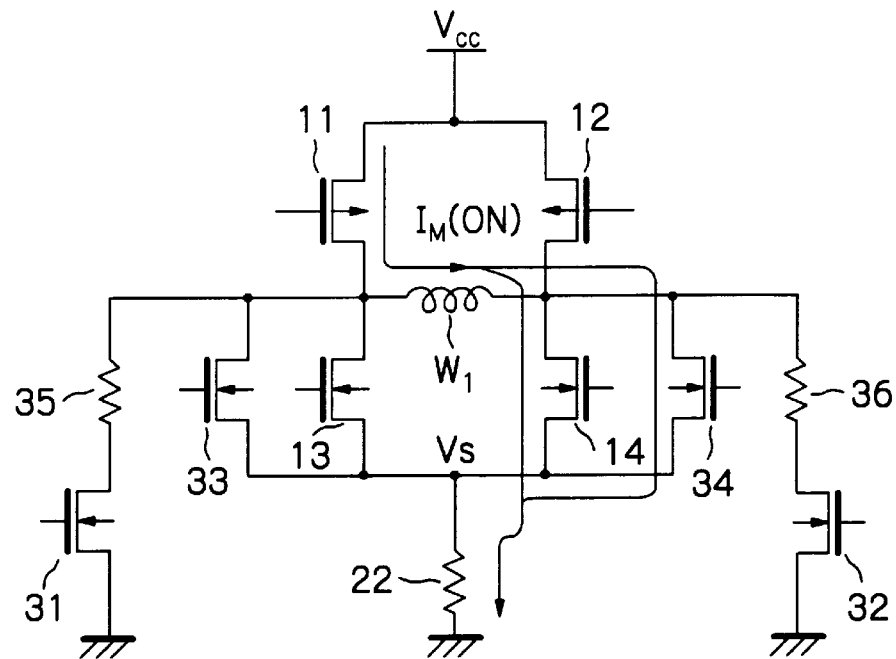
FIGS. 10A, 10B, 10C and 10D are circuit diagrams for explaining the operation of the apparatus of FIG. 9.
Figure 10B:
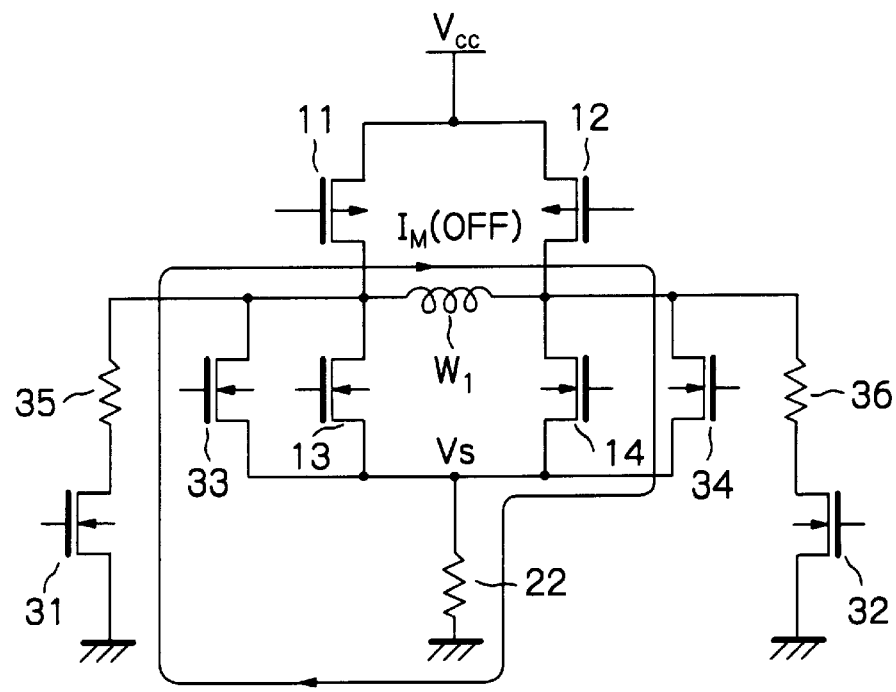
Figure 10C:
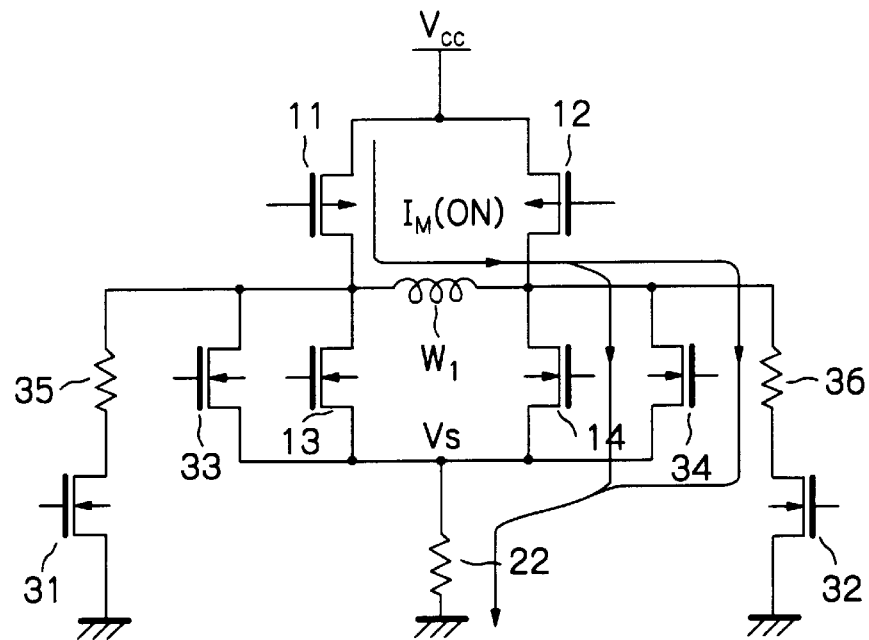
Figure 10D:
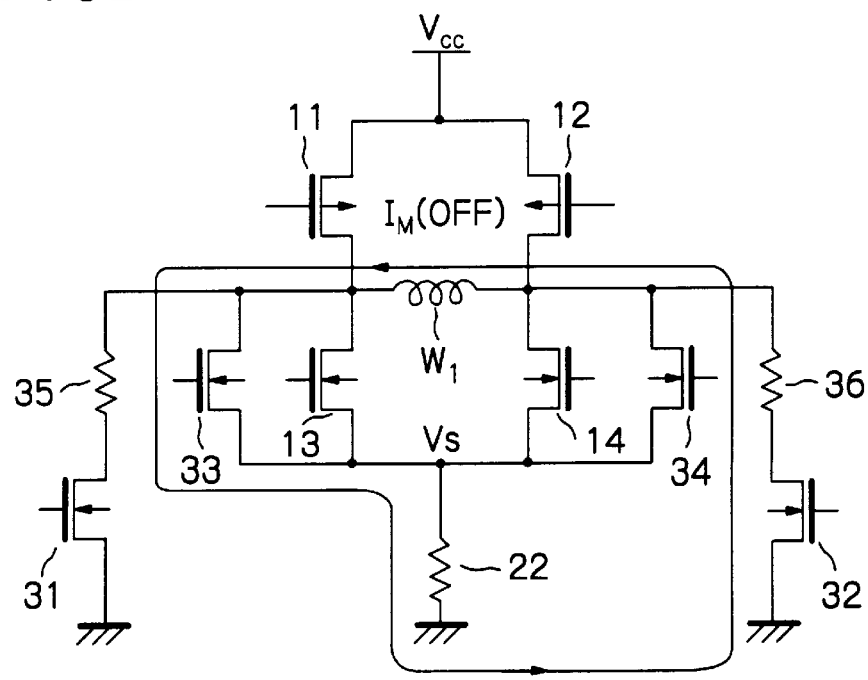

In FIG. 9, which illustrates a second embodiment of the present invention, resistors 35 and 36 are connected in series to the transistors 31 and 32, respectively, of FIG. 6. As illustrated in FIGS. 10A and 10C, in the modes I and III, the resistor 35 (36) does not affect the drive current $I_M$ (ON). On the other hand, as illustrated in FIGS. 10B and 10D, in the modes II and IV, the resistor 35 (36) is used to further increase the resistance of the current path for the regenerative current $I_M$ (OFF), i.e., to further decrease the time constant τ.

In FIG. 9, note that the resistor 35 (36) can be connected between the source of the transistor 31 (32) and the ground terminal $T_3$.

Figure 11:
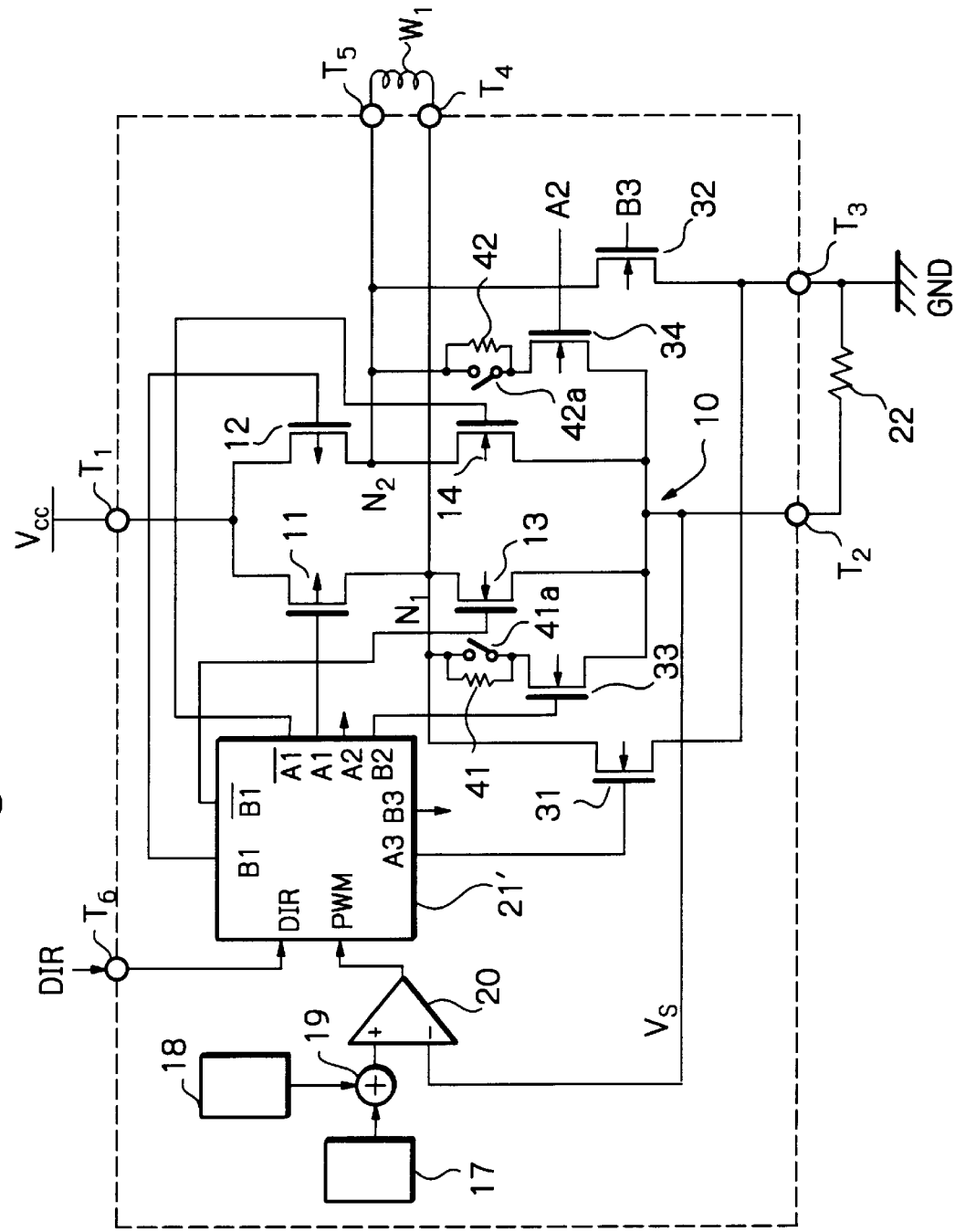
FIG. 11 is a circuit diagram illustrating a third embodiment of the stepping motor driving apparatus according to the present invention.
Figure 12A:
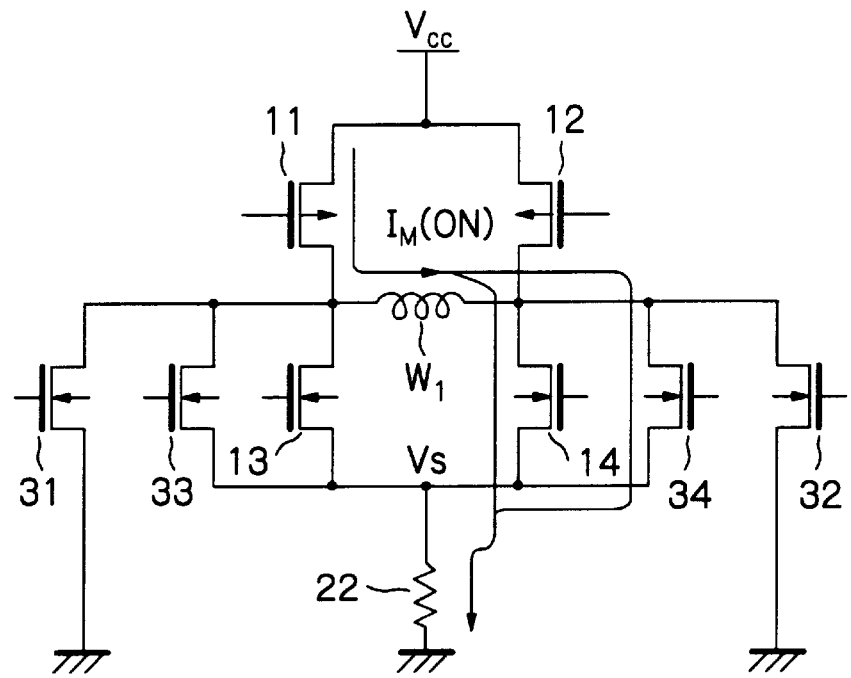
Figure 12B:
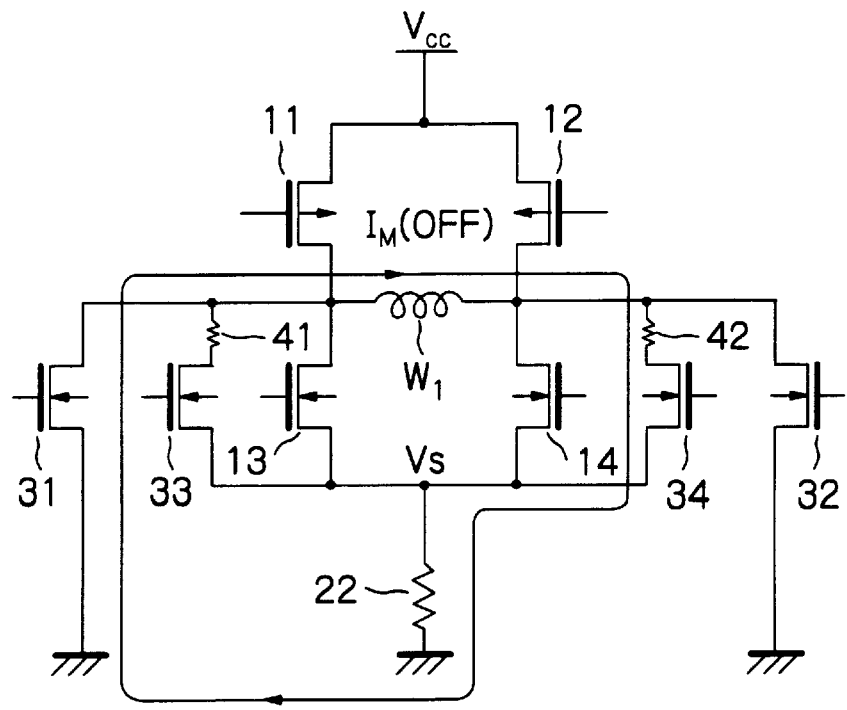

In FIG. 11, which illustrates a third embodiment of the present invention, a resistor 41 in parallel with a switch 41*a* is connected between the node $N_1$ and the drain of the transistor 33 of FIG. 6, and a resistor 42 in parallel with a switch 42*a* is connected between the node $N_2$ and the drain of the transistor 34 of FIG. 6. The switches 41*a* and 42*a* are operated by the PWM control signal. That is, when PWM is low, the switches 41*a* and 42*a* are turned ON, while, when PWM is high, the switches 41*a* and 42*a* are turned OFF. As illustrated in FIGS. 12A and 12C, in the modes I and III, since the resistors 41 and 42 are short-circuited, the resistors 41 and 42 do not affect the drive current $I_M$ (ON). On the other hand, as illustrated in FIGS. 12B and 12D, in the modes II and IV, the resistor 41 (42) is used to further increase the resistance of the current path for the regenerative current $I_M$ (OFF), i.e., to further decrease the time constant τ.

In FIG. 11, note that the resistor 41 (42) along with the switch 41*a* (41*b*) can be connected between the source of the transistor 33 (34) and the sense resistor terminal $T_2$.

Figure 13:
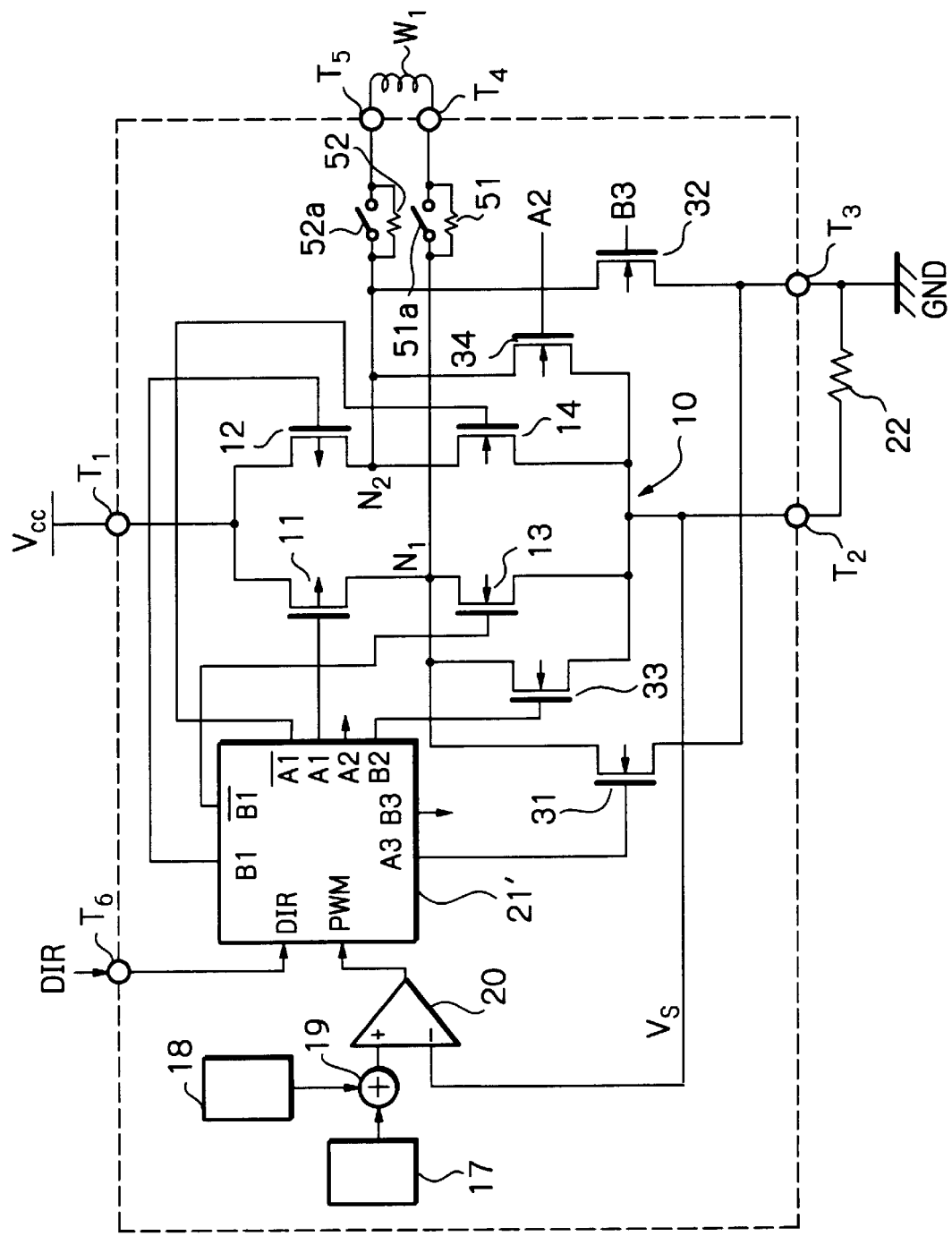
FIG. 13 is a circuit diagram illustrating a fourth embodiment of the stepping motor driving apparatus according to the present invention.
Figure 14A:
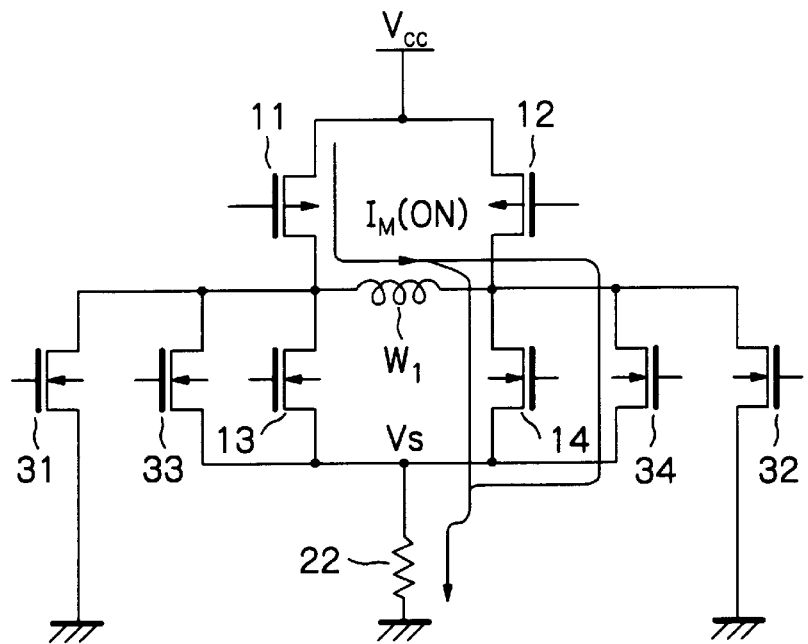
Figure 14B:
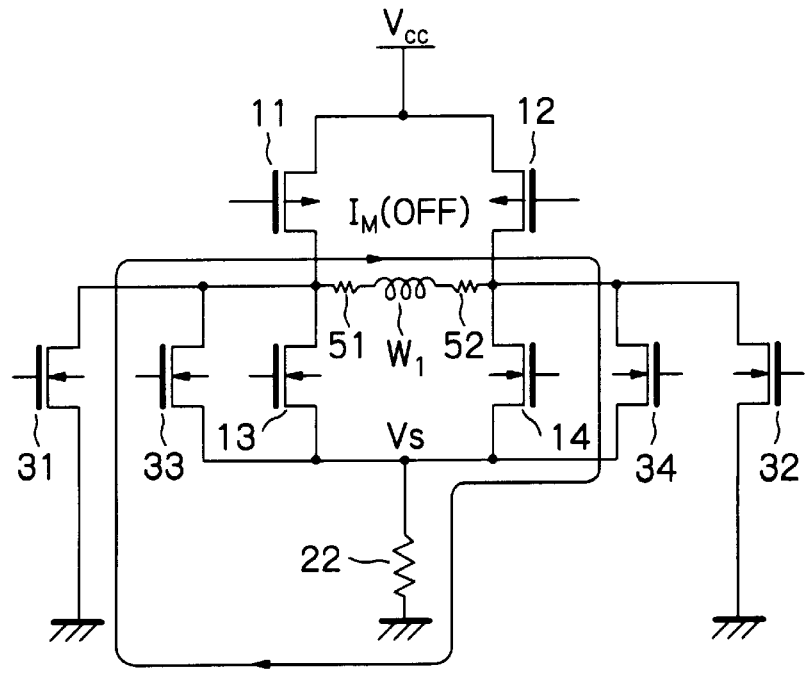

In FIG. 13, which illustrates a fourth embodiment of the present invention, a resistor 51 in parallel with a switch 51*a* is connected between the node $N_1$ and the terminal $T_4$ of FIG. 6, and a resistor 52 in parallel with a switch 52*a* is connected between the node $N_2$ and the terminal $T_5$ of FIG. 6. The switches 51*a* and 52*a* are operated by the PWM control signal. That is, when PWM is low, the switches 51*a* and 52*a* are turned ON, while, when PWM is high, the switches 51*a* and 52*a* are turned OFF. As illustrated in FIGS. 14A and 14C, in the modes I and III, since the resistors 51 (52) are short-circuited, the resistors 51 and 52 do not affect the drive current $I_M$ (ON). On the other hand, as illustrated in FIGS. 14B and 14D, in the modes II and IV, the resistors 51 and 52 are used to further increase the resistance of the current path for the regenerative current $I_M$ (OFF), i.e., to further decrease the time constant τ.

Figure 15:
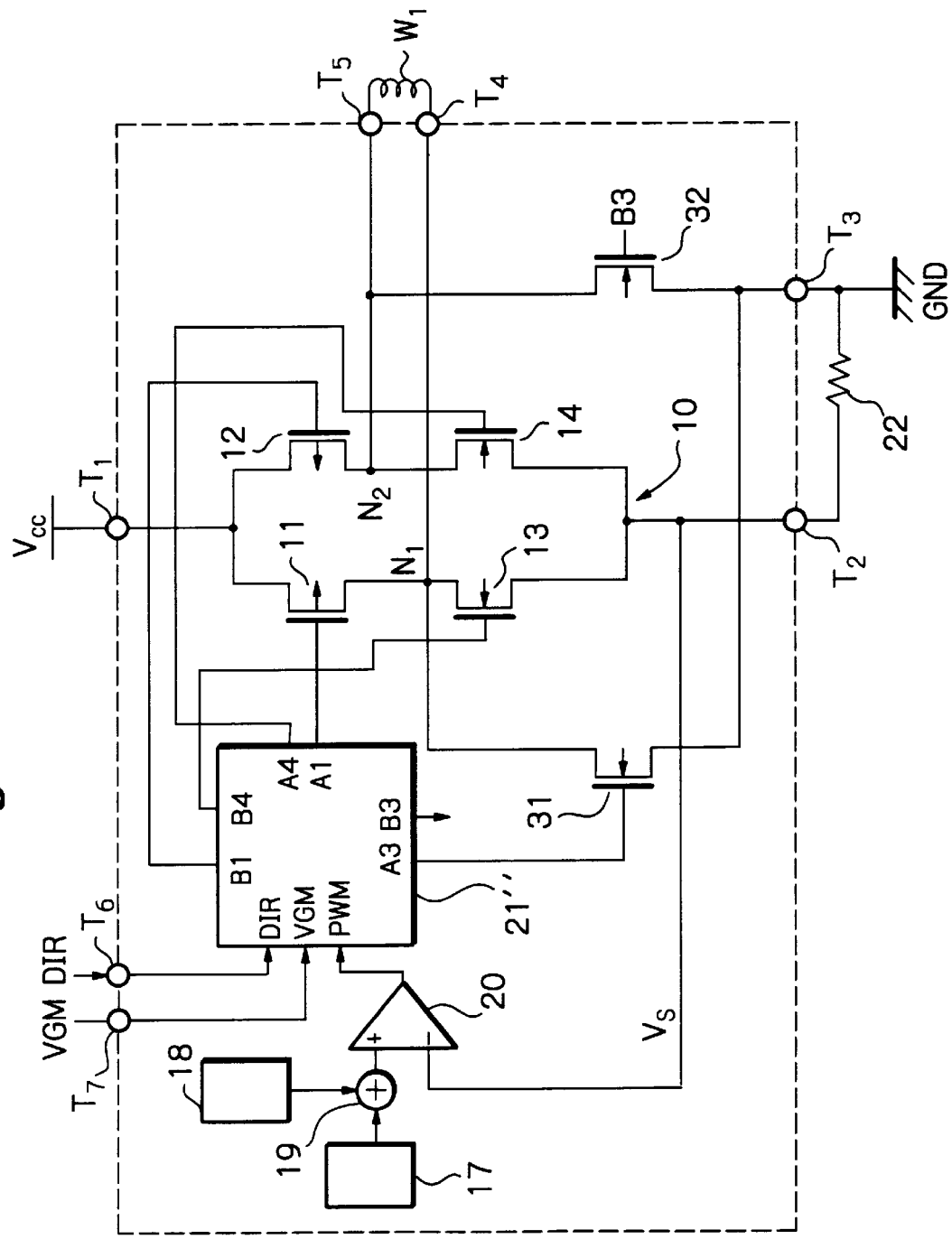
FIG. 15 is a circuit diagram illustrating a fifth embodiment of the stepping motor driving apparatus according to the present invention.

In FIG. 15, which illustrates a fifth embodiment of the present invention, the transistors 33 and 34 of FIG. 6 are deleted. That is, each of transistors 13 and 14 has two kinds of ON resistance states, i.e., a low ON resistance state and a high ON resistance state. When the transistor 13 (14) is in a low ON resistance state, the drive current $I_M$ (ON) flows therethrough. On the other hand, when the transistor 13 (14) is in a high ON resistance state, the regenerative current $I_M$ (OFF) flows therethrough.

Figure 16A:
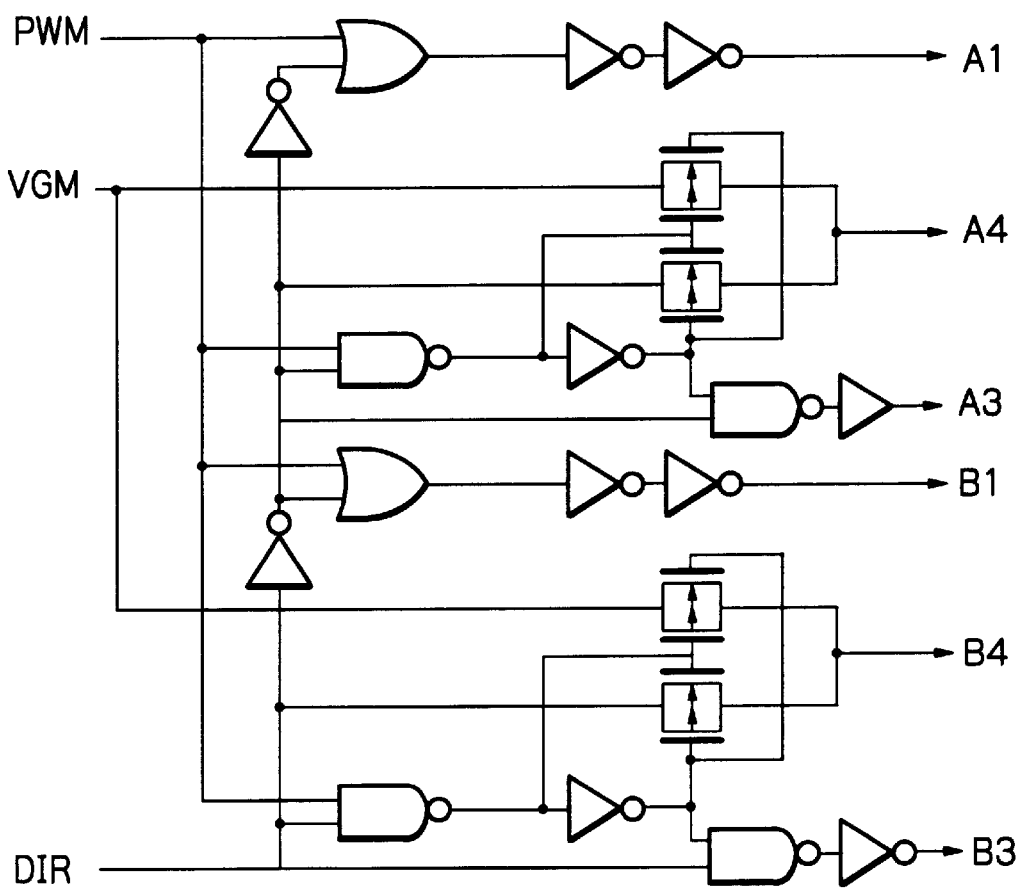
FIG. 16A is a logic circuit diagram of the predriver of FIG. 15.

The predriver 21' of FIG. 6 is modified to predriver 21" which is constructed by a logic circuit as illustrated is FIG. 16A, and the relationship between the inputs and outputs of the predriver 21" is shown in FIG. 16B. Note that, an intermediate voltage VGM such as $V_{CC}/2$ is supplied from a terminal $T_7$ to the predriver 21".

Figure 17A:
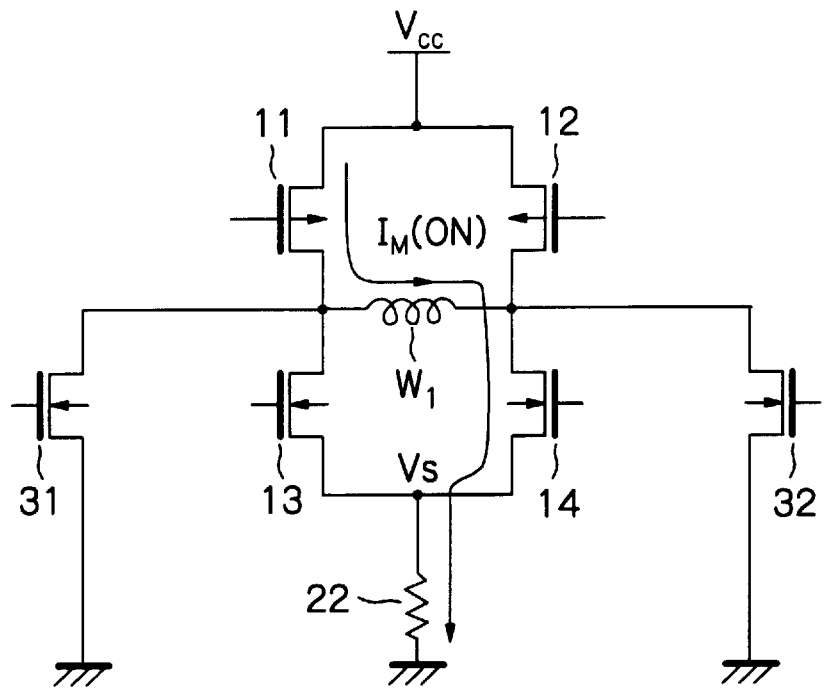
Figure 17B:
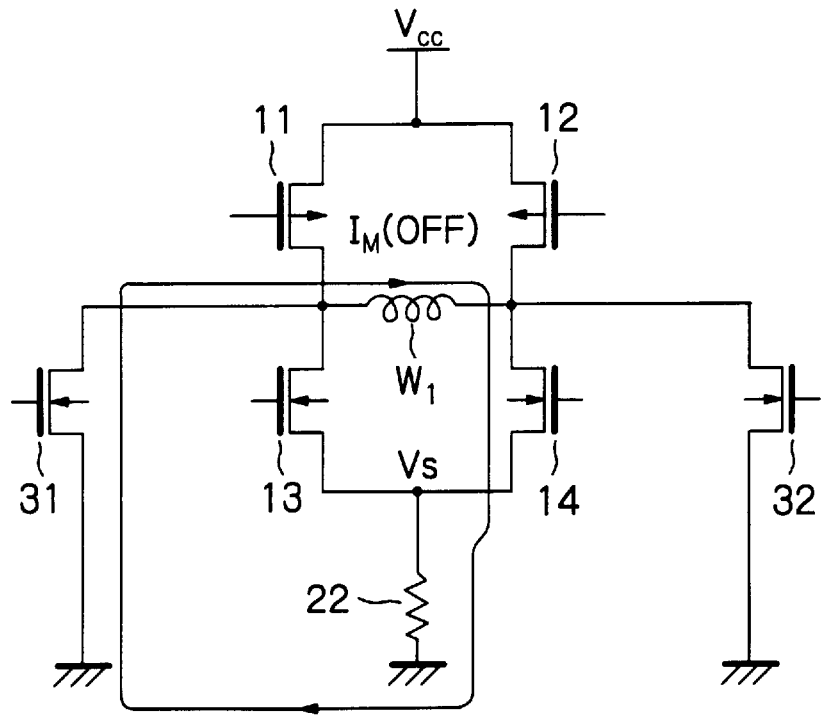

In a mode I where the direction signal DIR is low and the PWM control signal is low, the transistors 11 and 14 are turned ON and the transistors 12, 13, 31 and 32 are turned OFF. As a result, as illustrated in FIG. 17A, a drive current $I_M$ (ON) flows from the power supply terminal ($V_{CC}$) via the transistors 11 and 14 and the sense resistor 22 to the ground terminal (GND). Then, when the PWM control signal is switched from low to high, so that the mode I is switched to a mode II, the transistors 11 is turned OFF and simultaneously, the transistor 31 is turned ON. In this case, the transistor 14 is in a high ON resistance state. As a result, as illustrated in FIG. 17B, a regenerative current $I_M$ (OFF) due to the counter-electromotive force of the winding $W_1$ flows through a current path formed by a transistor 14, the sense resistor 22 and the transistor 31.

Similarly, in a mode III where the direction signal DIR is high and the PWM control signal is low, the transistors 12 and 13 are turned ON and the transistors 11, 14, 31 and 32 are turned OFF. As a result, as illustrated in FIG. 17C, a drive current $I_M$ (ON) flows from the power supply terminal ($V_{CC}$) via the transistors 12 and 13 and the sense resistor 22 to the ground terminal (GND). Then, when the PWM control signal is switched from low to high, so that the mode III is switched to a mode IV, the transistor 12 is turned OFF and simultaneously, the transistor 32 is turned ON. In this case, the transistor 13 is in a high ON resistance state. As a result, as illustrated in FIG. 17D, a regenerative current $I_M$ (OFF) due to the counter-electromotive force of the winding $W_1$ flows through a current path formed by the transistor 13, the sense resistor 22 and the transistor 32.

Thus, the drive current $I_M$ for the winding $W_1$ formed by the currents $I_M$ (ON) and $I_M$ (OFF) can form a psuedo sine waveform.

In the fifth embodiment, in the modes II and IV, since the ON resistance of the transistor 13 (14) is made larger, the time constant τ of the regenerative current $I_M$ (OFF) is made smaller, so that the reduction rate of the regenerative current $I_M$ (OFF) is large. Also, the initial sense voltage $V_S$ is decreased. Therefore, the sense voltage $V_S$ of the sense resistor 22 can sufficiently follow the change of the step reference voltage signal of the step reference voltage generating circuit 17. As a result, the drive current $I_M$ is not distorted, which hardly creates vibration and noise in the motor.

In the above-described embodiments, although the transistors 11 and 12 are a P-channel type, the transistors 11 and 12 can be of an N-channel type where a voltage step-up circuit is required.

Also, in the above-described embodiments, although MOS transistors are used as switching elements, other switching elements such as bipolar transistors or insulated gate bipolar transistors (IGBTs) can be used a such switching elements.

Figure 18:
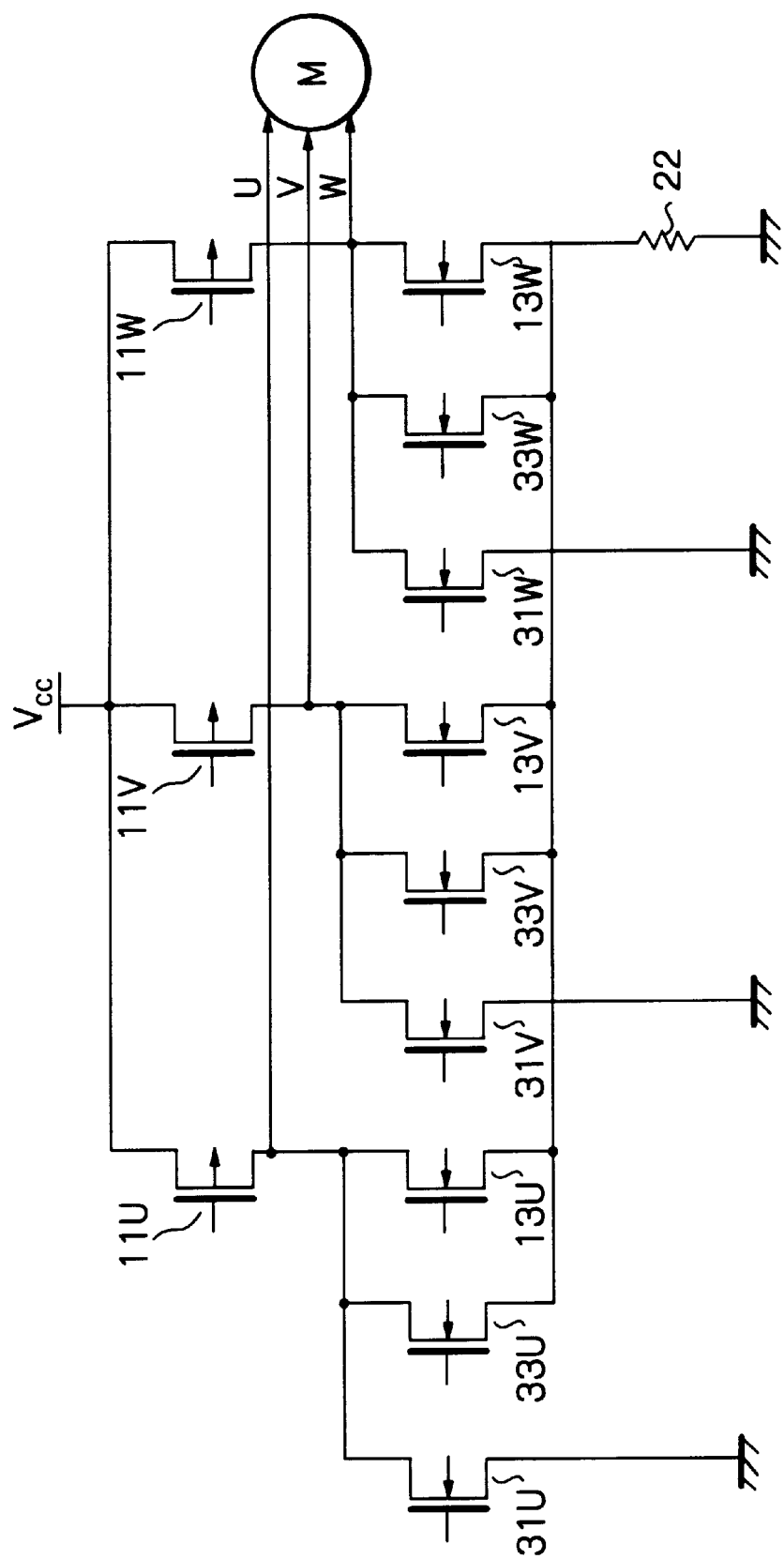
FIG. 18 is a circuit diagram illustrating a modification of the apparatus of FIG. 6.

Further, in the above-described embodiments, the H bridge circuit 10 can be replaced by a multi-phase bridge circuit such as a three-phase bridge circuit as illustrated in FIG. 18. In FIG. 18, the H bridge circuit 10 of the first embodiment is modified. Note that the second, third, fourth and fifth embodiments can be easily applied to a stepping motor driving apparatus including a multiphase bridge circuit in the same way as in FIG. 18.

Figure 19A:
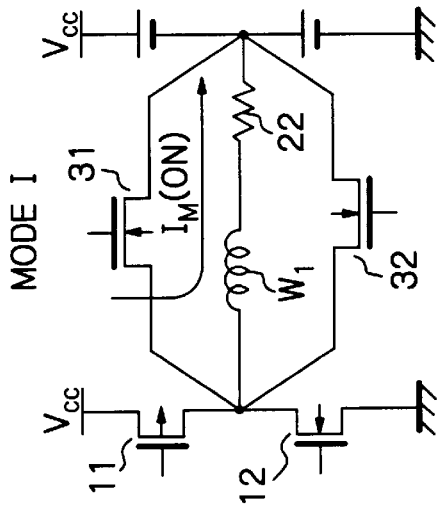
FIG. 19A is a circuit diagram illustrating a modification of the apparatus of FIG. 6.
Figure 19B:
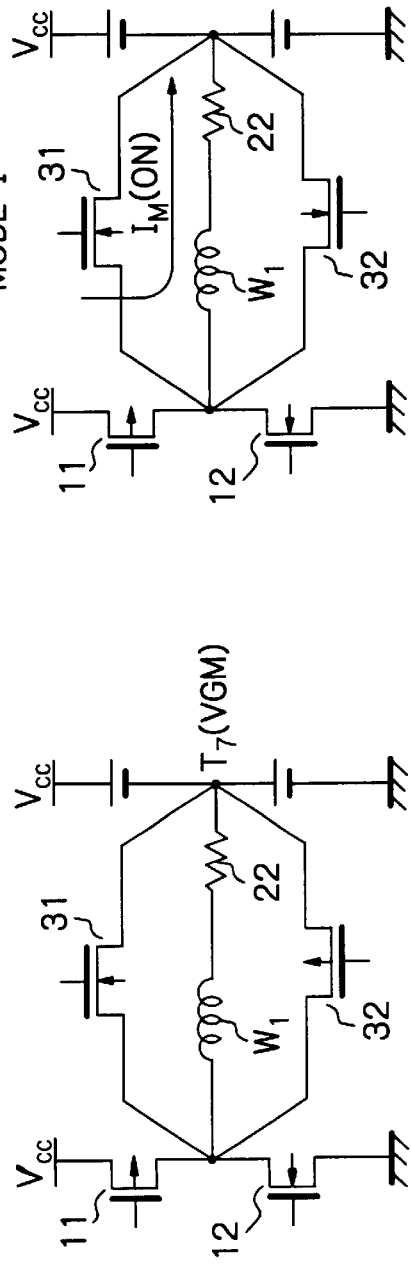
FIGS. 19B, 19C, 19D and 19E are circuit diagrams for explaining the operation of the apparatus of FIG. 19A.
Figure 19E:
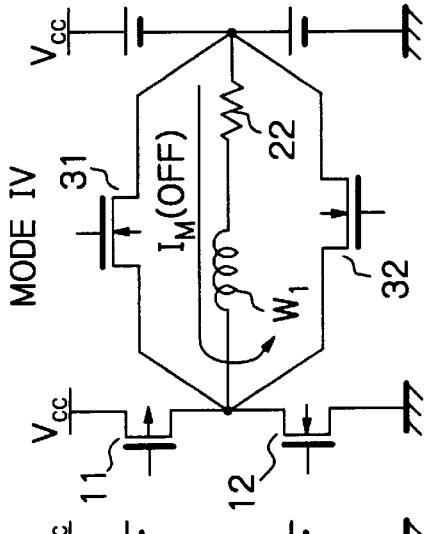
Figure 19D:
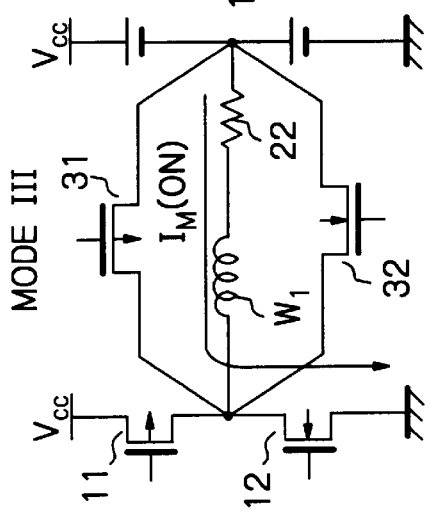
Figure 19C:
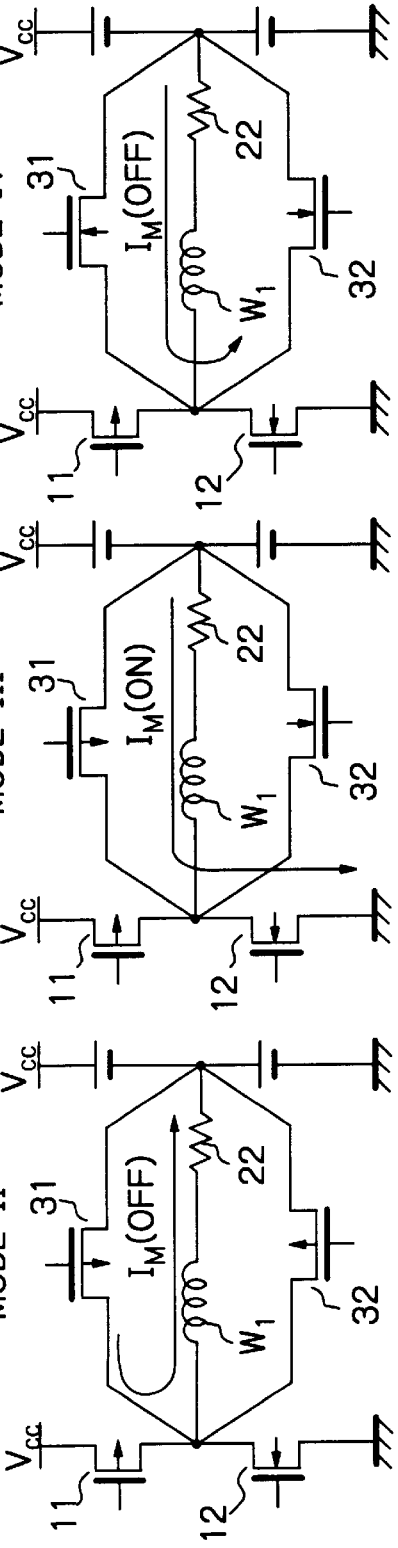
Figure 20B:
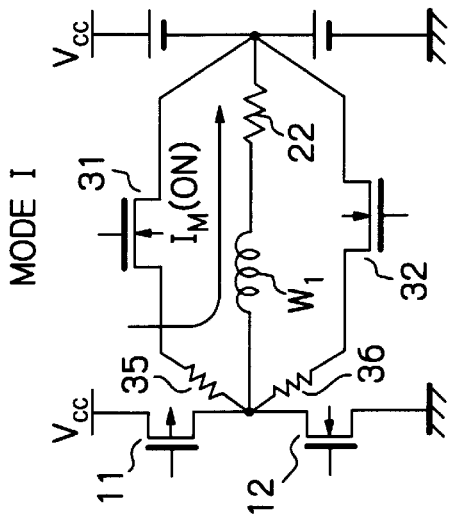
FIGS. 20B, 20C, 20D and 20E are circuit diagrams for explaining the operation of the apparatus of FIG. 20A.
Figure 20A:
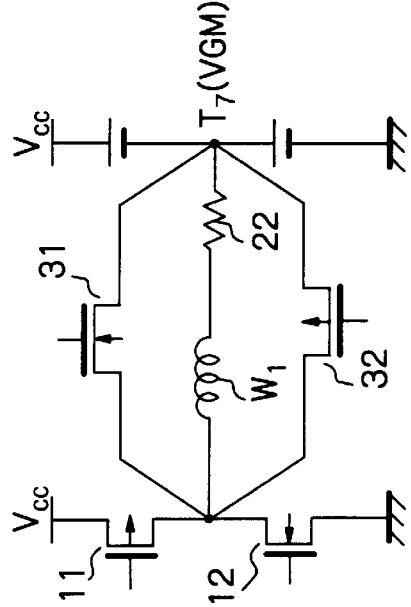
FIG. 20A is a circuit diagram illustrating a modification of the apparatus of FIG. 9 or 11.
Figure 20E:
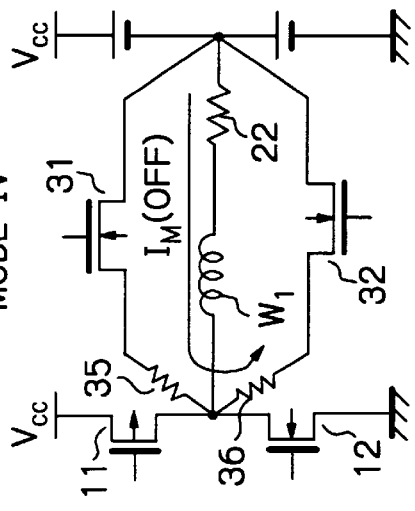
Figure 20D:
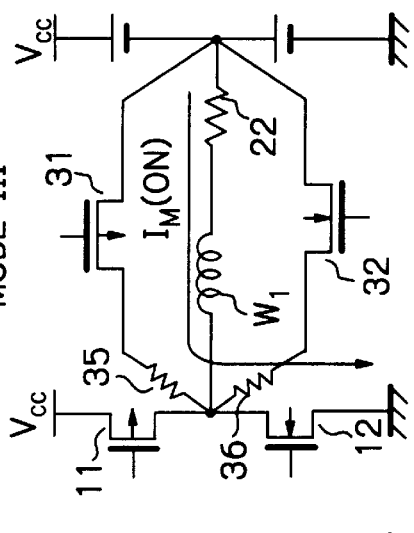
Figure 20C:
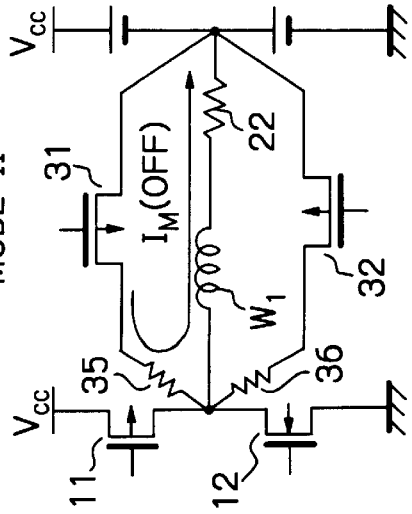

Additionally, the H bridge circuit 10 of the above-described embodiments can be replaced by a half bridge circuit. For example, in the first embodiment, as illustrated in FIG. 19A, the transistors 31 and 32 are connected in parallel with a series of the winding $W_1$ and the sense resistor 22. In this case, the operation modes I, II, III and IV are illustrated in FIGS. 19B, 19C, 19D and 19E. That is, the resistance of the current path for the regenerative current is increased by the high ON resistance of the transistor 31 (32). In the second and third embodiments, as illustrated in FIG. 20A, the resistors 35 and 36 are connected to the transistors 31 and 32, respectively, of FIG. 19A. In this case, the operation modes I, II, III and IV are illustrated in FIGS. 20B, 20C, 20D and 20E. That is, the resistance of the current path for the regenerative current is increased by the resistor 35 (36) even if the high ON resistance of the transistor 32 (32) is small. In the fourth embodiment, as illustrated in FIG. 21A, the resistor 51 along with the switch 51a is connected to the winding $W_1$ of the motor of FIG. 19A. In this case, the operation modes I, II, III and IV are illustrated in FIGS. 21B, 21C, 21D and 21E. That is, the resistance of the current path for the regenerative current is increased by the resistor 51.

As explained hereinabove, according to the present invention, since the time constant of the regenerative current can be small, the reduction rate of the regenerative current can be large, and the initial sense voltage $V_S$ can be decreased. Therefore, the sense voltage of the sense resistor can sufficiently follow the change of the step reference voltage signal of the step reference voltage generating circuit. As a result, the drive current is not distorted, which hardly creates vibration and noise in the motor.

What is claimed is:

1. An apparatus for driving a stepping motor in a micro step manner by a PWM control signal generated based on a sense voltage, comprising:

first and second power supply terminals;

a first switching element connected between said first power supply terminal and a first terminal of said stepping motor;

a second switching element connected between a second terminal of said stepping motor and a reference resistor;

a third switching element connected in parallel to said second switching element, an ON resistance of said third switching element being larger than an ON resistance of said second switching element;

a sense resistor, connected between said second switching element and said second power supply terminal, for generating said sense voltage; and a fourth switching element connected between the first terminal of said stepping motor and said second power supply terminal, and first, second and third switching elements being turned ON and said fourth switching element being turned OFF, when being PWM signal is activated, said third and fourth switching elements being turned ON and said first and second switching elements being turned OFF, when said PWM signal is not activated.

2. The apparatus as set forth in claim 1, further comprising a resistor connected in series to said fourth switching element.

3. The apparatus as set forth in claim 1, further comprising a resistor connected in series to said third switching element.

4. The apparatus as set forth in claim 1, further comprising:

a resistor connected in series to said stepping motor;

a switch, connected in parallel to said resistor and being turned ON when said PWM control signal is activated.

5. An apparatus for driving a stepping motor in a micro step manner by a PWM control signal generated based on a sense voltage, comprising:

first and second power supply terminals;

a first switching element connected between said first power supply terminal and a first terminal of said stepping motor;

a second switching element connected between a second terminal of said stepping motor and a reference resistor;

a reference resistor, connected between said second switching element and said second power supply terminal, for generating said sense voltage; and a third switching element connected between the first terminal of said stepping motor and said second power supply terminal, said first switching element being turned ON, said second switching element being in a low ON resistance state, and said third switching element being turned OFF, when said PWM signal is activated, said third switching element being turned ON, and second switching element being in a high ON resistance state, and said first switching element being turned OFF, when said PWM signal is not activated, a resistance value of said second switching element in said high ON resistance state being larger than a resistance value of said second switching element in said low ON resistance state.

6. An apparatus for driving a stepping motor in a micro step manner by a PWM control signal generated based on a sense voltage, comprising:

first and second power supply terminals;

a third power supply terminal to which an intermediate voltage between voltages at said first and second power supply terminals is applied;

a first switching element connected between said first power supply terminal and a first terminal of said stepping motor;

a second switching element connected between a second terminal of said stepping motor and a reference resistor, said second switching element receiving said intermediate voltage so that said second switching element is in a low ON resistance state when said first switching element is turned OFF; and a third switching element connected between the first terminal of said stepping motor and said second power supply terminal;

said sense resistor being connected between said second switching element and said second power supply terminal to generate said sense voltage, said first switching element being turned ON, said second switching element being in said low ON resistance state, and said third switching element being turned OFF, when said PWM signal is activated, said third switching element being turned ON, said second switching element being in a high ON resistance state, and said first switching element being turned OFF, when said PWM signal is not activated, a resistance value of said second switching element in said high ON resistance state being larger than a resistance value of said second switching element in said low ON resistance state.

7. The apparatus as set forth in claim 6, further comprising a resistor connected in series to said second switching element.

8. The apparatus as set forth in claim 6, further comprising:

a resistor connected in series to said stepping motor;

a switch, connected in parallel to said resistor and being turned ON when said PWM control signal is activated.

* * * * *